US008938753B2

(12) United States Patent
Tang et al.

(10) Patent No.: US 8,938,753 B2
(45) Date of Patent: Jan. 20, 2015

(54) CONFIGURABLE COMPUTER SYSTEM

(75) Inventors: Aaron Tang, Somerville, MA (US); Robert Sanford Havoc Pennington, Asheville, NC (US); John Chuang, Brookline, MA (US); Chris Bambacus, Framingham, MA (US); Eben Eliason, Providence, RI (US); Chris Moody, Boulder, CO (US); Johan Bilien, Somerville, MA (US)

(73) Assignee: LITL LLC, Boston, MA (US)

( * ) Notice: Subject to any disclaimer, the term of this patent is extended or adjusted under 35 U.S.C. 154(b) by 295 days.

(21) Appl. No.: 12/910,333

(22) Filed: Oct. 22, 2010

(65) Prior Publication Data

US 2011/0283314 A1 Nov. 17, 2011

Related U.S. Application Data

(63) Continuation-in-part of application No. 29/361,526, filed on May 12, 2010, now Pat. No. Des. 654,908.

(51) Int. Cl.
*H04N 5/445* (2011.01)
*G06F 3/00* (2006.01)
(Continued)

(52) U.S. Cl.
CPC ....... *H04N 21/4143* (2013.01); *H04N 21/4221* (2013.01); *H04N 21/478* (2013.01); *H04N 21/42214* (2013.01); *H04N 21/42224* (2013.01)
USPC ............................................ 725/37; 348/734

(58) Field of Classification Search
USPC ................... 725/39, 53, 52, 85, 44, 110, 116; 348/734, 157, E05, 96; 345/156; 200/4; 709/201; 710/16
See application file for complete search history.

(56) References Cited

U.S. PATENT DOCUMENTS 3,468,576 A 9/1969 Beyer et al.
4,709,342 A 11/1987 Hosoda et al.
(Continued)

FOREIGN PATENT DOCUMENTS

DE 19952486 5/2001
EP 0588210 3/1993
(Continued)

OTHER PUBLICATIONS

Notification of Transmittal of the International Search Report and the Written Opinion of the International Searching Authority, or the Declaration, International Application No. PCT/US2011/057316.
(Continued)

*Primary Examiner* — Nasser Goodarzi
*Assistant Examiner* — Adil Ocak
(74) *Attorney, Agent, or Firm* — Lando & Anastasi, LLP

(57) ABSTRACT

According to one aspect, embodiments of the invention provide a computer system comprising a base station having a communication interface adapted to communicate with an external network, an external display device configured to receive output display signals from the base station, a user interface displayed on the external display device and generated in response to the output display signals, wherein the user interface is selectively configurable in one of a plurality of modes of content, and a remote control configured to interact with the user interface displayed by the external display device, wherein the remote control is selectively operable in at least two configurations and wherein the selectively operable remote is configured to permit a user to select for display on the external display device one of the plurality of modes of content of the user interface based on the selected configuration of the remote control.

18 Claims, 15 Drawing Sheets

(51) Int. Cl.
   *G06F 13/00* (2006.01)
   *H04N 21/4143* (2011.01)
   *H04N 21/422* (2011.01)
   *H04N 21/478* (2011.01)

(56) References Cited

U.S. PATENT DOCUMENTS

| | | |
|---|---|---|
| 4,939,514 A | 7/1990 | Miyazaki |
| D333,636 S | 3/1993 | Issa |
| 5,200,913 A | 4/1993 | Hawkins et al. |
| 5,231,381 A | 7/1993 | Duwaer |
| 5,268,817 A | 12/1993 | Miyagawa et al. |
| 5,278,362 A | 1/1994 | Ohashi |
| 5,319,386 A | 6/1994 | Gunn et al. |
| 5,383,735 A | 1/1995 | Smiley |
| 5,515,345 A | 5/1996 | Barreira |
| 5,541,372 A | 7/1996 | Baller et al. |
| 5,666,113 A | 9/1997 | Logan |
| 5,673,066 A | 9/1997 | Toda et al. |
| 5,712,760 A | 1/1998 | Coulon |
| D391,927 S | 3/1998 | Faranda |
| D392,944 S | 3/1998 | Issa |
| D395,868 S | 7/1998 | Lino |
| 5,790,371 A | 8/1998 | Latocha et al. |
| 5,793,355 A | 8/1998 | Youens |
| 5,796,575 A | 8/1998 | Podwalny et al. |
| D399,526 S | 10/1998 | Brady |
| 5,825,352 A | 10/1998 | Bisset et al. |
| 5,841,631 A | 11/1998 | Shin et al. |
| 5,847,698 A | 12/1998 | Reavey et al. |
| 5,854,625 A | 12/1998 | Frisch et al. |
| 5,900,848 A | 5/1999 | Haneda et al. |
| 5,949,643 A | 9/1999 | Batio |
| D416,003 S | 11/1999 | Sciefer et al. |
| 5,987,704 A | 11/1999 | Tang |
| 6,005,767 A | 12/1999 | Ku et al. |
| 6,011,592 A | 1/2000 | Vaughan et al. |
| 6,034,672 A | 3/2000 | Gaultier et al. |
| 6,055,478 A * | 4/2000 | Heron .......................... 701/486 |
| 6,067,074 A | 5/2000 | Lueders |
| 6,067,081 A | 5/2000 | Hahlganss et al. |
| 6,067,224 A | 5/2000 | Nobuchi |
| 6,118,435 A | 9/2000 | Fujita et al. |
| 6,118,449 A | 9/2000 | Rosen et al. |
| 6,124,845 A | 9/2000 | Toda et al. |
| 6,222,507 B1 | 4/2001 | Gouko |
| 6,223,393 B1 | 5/2001 | Knopf |
| 6,243,080 B1 | 6/2001 | Molne |
| 6,262,885 B1 | 7/2001 | Emma et al. |
| 6,266,236 B1 | 7/2001 | Ku et al. |
| 6,275,376 B1 | 8/2001 | Moon |
| 6,295,038 B1 | 9/2001 | Rebeske |
| 6,302,612 B1 | 10/2001 | Fowler et al. |
| 6,323,846 B1 | 11/2001 | Westerman et al. |
| D452,238 S | 12/2001 | Sugano |
| 6,327,482 B1 | 12/2001 | Miyashita |
| 6,343,006 B1 | 1/2002 | Moscovitch et al. |
| 6,377,444 B1 | 4/2002 | Price et al. |
| 6,388,655 B1 | 5/2002 | Leung |
| D462,069 S | 8/2002 | Gatto |
| 6,429,846 B2 | 8/2002 | Rosenberg et al. |
| D463,797 S | 10/2002 | Andre |
| 6,464,195 B1 | 10/2002 | Hildebrandt |
| 6,504,530 B1 | 1/2003 | Wilson et al. |
| 6,510,049 B2 | 1/2003 | Rosen |
| D476,326 S | 6/2003 | Tanimura |
| D479,708 S | 9/2003 | Hwang |
| 6,628,267 B2 | 9/2003 | Karidis et al. |
| 6,639,584 B1 | 10/2003 | Li |
| 6,642,909 B1 | 11/2003 | Oliva |
| 6,659,516 B2 | 12/2003 | Wang et al. |
| 6,661,426 B1 | 12/2003 | Jetha |
| 6,665,175 B1 | 12/2003 | deBoer |
| 6,697,055 B1 | 2/2004 | Billister |
| 6,721,881 B1 | 4/2004 | Bian et al. |
| D491,177 S | 6/2004 | Andre |
| D491,936 S | 6/2004 | Jao |
| D494,162 S | 8/2004 | Kondo |
| 6,771,494 B2 | 8/2004 | Shimano |
| D495,674 S | 9/2004 | Yoo |
| D495,694 S | 9/2004 | Chase |
| 6,788,527 B2 | 9/2004 | Doczy et al. |
| 6,819,304 B2 | 11/2004 | Branson |
| 6,829,140 B2 | 12/2004 | Shimano et al. |
| 6,859,219 B1 | 2/2005 | Sall |
| D504,128 S | 4/2005 | Maskatia |
| 6,940,494 B2 | 9/2005 | Hoshino et al. |
| 6,944,012 B2 | 9/2005 | Doczy et al. |
| 6,963,485 B2 | 11/2005 | Hong |
| D512,997 S | 12/2005 | Lee |
| D513,509 S | 1/2006 | Kawa |
| D516,552 S | 3/2006 | Iseki |
| D517,541 S | 3/2006 | Maskatia |
| D518,042 S | 3/2006 | Kanayama |
| D523,429 S | 6/2006 | Lin |
| 7,061,472 B1 | 6/2006 | Schweizer et al. |
| 7,072,179 B1 | 7/2006 | Curran et al. |
| D528,541 S | 9/2006 | Maskatia |
| D528,993 S | 9/2006 | Wilson |
| D531,157 S | 10/2006 | Lheem |
| 7,138,962 B2 | 11/2006 | Koenig |
| D534,147 S | 12/2006 | Chan |
| 7,148,875 B2 | 12/2006 | Rosenberg et al. |
| D534,531 S | 1/2007 | Ogasawara |
| D535,292 S | 1/2007 | Shi |
| D544,846 S | 6/2007 | Kindle |
| 7,239,508 B2 | 7/2007 | Ferrucei |
| 7,245,293 B2 | 7/2007 | Hoshino et al. |
| 7,250,207 B1 | 7/2007 | Heal et al. |
| 7,274,353 B2 | 9/2007 | Chiu et al. |
| 7,312,791 B2 | 12/2007 | Hoshino et al. |
| D563,935 S | 3/2008 | Kim et al. |
| 7,428,142 B1 | 9/2008 | Ligtenberg et al. |
| 7,436,395 B2 | 10/2008 | Chiu et al. |
| D580,392 S | 11/2008 | Kim et al. |
| D581,371 S | 11/2008 | Richmond |
| 7,469,381 B2 | 12/2008 | Ording |
| 7,499,040 B2 | 3/2009 | Zadesky et al. |
| 7,511,702 B2 | 3/2009 | Hotelling |
| D590,368 S | 4/2009 | Mezaki |
| 7,515,140 B2 | 4/2009 | Philipp |
| 7,522,946 B2 | 4/2009 | Im |
| D592,649 S | 5/2009 | L'Henaff et al. |
| D593,085 S | 5/2009 | Behar et al. |
| D593,086 S | 5/2009 | Behar et al. |
| D593,091 S | 5/2009 | Behar et al. |
| 7,538,686 B2 | 5/2009 | Yeh et al. |
| 7,538,760 B2 | 5/2009 | Hotelling et al. |
| D594,875 S | 6/2009 | Sheba et al. |
| 7,554,614 B2 | 6/2009 | Satou |
| D599,328 S | 9/2009 | Derocher et al. |
| 7,592,999 B2 | 9/2009 | Rosenberg et al. |
| D602,903 S | 10/2009 | Tompkin et al. |
| 7,602,384 B2 | 10/2009 | Rosenberg et al. |
| 7,610,069 B2 | 10/2009 | Kwak et al. |
| D603,827 S | 11/2009 | Tompkin et al. |
| D605,635 S | 12/2009 | Edahiro et al. |
| D606,520 S | 12/2009 | McRae et al. |
| D606,539 S | 12/2009 | Liao et al. |
| 7,643,014 B2 | 1/2010 | Yang et al. |
| D612,359 S | 3/2010 | Oh et al. |
| 7,688,313 B2 | 3/2010 | Lii et al. |
| D613,262 S | 4/2010 | Ahn et al. |
| D613,271 S | 4/2010 | Painter |
| 7,710,397 B2 | 5/2010 | Krah et al. |
| D616,875 S | 6/2010 | Oh et al. |
| D618,228 S | 6/2010 | Oh et al. |
| D618,647 S | 6/2010 | Wykes et al. |
| 7,728,820 B2 | 6/2010 | Rosenberg et al. |
| 7,746,325 B2 | 6/2010 | Roberts |
| 7,755,607 B2 | 7/2010 | Poupyrev et al. |
| 7,760,190 B2 | 7/2010 | Yeh |
| 7,768,503 B2 | 8/2010 | Chiu et al. |
| D624,041 S | 9/2010 | Liu |

(56) References Cited

U.S. PATENT DOCUMENTS

| | | | |
|---|---|---|---|
| D628,984 S | 12/2010 | VanDuyn et al. |
| D628,985 S | 12/2010 | VanDuyn et al. |
| D629,379 S | 12/2010 | Wykes et al. |
| 7,848,703 B1 | 12/2010 | Beard et al. |
| D630,201 S | 1/2011 | Oh et al. |
| D633,887 S | 3/2011 | Chen |
| D654,908 S | 2/2012 | Chuang et al. |
| 2002/0005818 A1 | 1/2002 | Bruzzone |
| 2002/0021258 A1 | 2/2002 | Koenig |
| 2003/0048595 A1 | 3/2003 | Hsieh |
| 2003/0109232 A1 | 6/2003 | Park |
| 2003/0206394 A1 | 11/2003 | Ossia |
| 2004/0001049 A1 | 1/2004 | Oakley |
| 2004/0041800 A1 | 3/2004 | Daniels |
| 2004/0125086 A1 | 7/2004 | Hagermoser et al. |
| 2004/0196268 A1 | 10/2004 | Hsu et al. |
| 2004/0203535 A1 | 10/2004 | Kim |
| 2004/0228076 A1 | 11/2004 | Clapper |
| 2005/0018396 A1 | 1/2005 | Nakajima |
| 2005/0041378 A1 | 2/2005 | Hamada |
| 2005/0063145 A1 | 3/2005 | Homer |
| 2005/0122315 A1 | 6/2005 | Chalk et al. |
| 2005/0146845 A1 | 7/2005 | Moscovitch |
| 2005/0210399 A1 | 9/2005 | Filner |
| 2005/0221865 A1 | 10/2005 | Nishiyama et al. |
| 2005/0257400 A1 | 11/2005 | Sommerer |
| 2005/0282596 A1 | 12/2005 | Park |
| 2006/0033722 A1 | 2/2006 | Chiu et al. |
| 2006/0075276 A1 | 4/2006 | Kataria et al. |
| 2006/0080710 A1 | 4/2006 | Carthern |
| 2006/0109256 A1 | 5/2006 | Grant et al. |
| 2006/0119586 A1 | 6/2006 | Grant et al. |
| 2006/0119589 A1 | 6/2006 | Rosenberg et al. |
| 2006/0126284 A1 | 6/2006 | Moscovitch |
| 2006/0181517 A1 | 8/2006 | Zadesky et al. |
| 2006/0232559 A1 | 10/2006 | Chien et al. |
| 2006/0250377 A1 | 11/2006 | Zadesky et al. |
| 2006/0264243 A1 | 11/2006 | Aarras |
| 2006/0268500 A1 | 11/2006 | Kuhn |
| 2006/0274050 A1 | 12/2006 | Lii |
| 2006/0284858 A1 | 12/2006 | Rekimoto |
| 2007/0013674 A1 | 1/2007 | Woolley |
| 2007/0013677 A1 | 1/2007 | Rosenberg et al. |
| 2007/0040815 A1 | 2/2007 | Rosenberg et al. |
| 2007/0070044 A1 | 3/2007 | Yeh et al. |
| 2007/0075983 A1 | 4/2007 | Chiu et al. |
| 2007/0103451 A1 | 5/2007 | Heimann et al. |
| 2007/0119698 A1 | 5/2007 | Day |
| 2007/0137901 A1 | 6/2007 | Chen |
| 2007/0137988 A1* | 6/2007 | Yu et al. ............... 200/4 |
| 2007/0138806 A1 | 6/2007 | Ligtenberg et al. |
| 2007/0174869 A1 | 7/2007 | Kim |
| 2007/0182663 A1 | 8/2007 | Biech |
| 2007/0186015 A1* | 8/2007 | Taft et al. ............ 710/16 |
| 2007/0229478 A1 | 10/2007 | Rosenberg et al. |
| 2007/0247446 A1 | 10/2007 | Orsley et al. |
| 2007/0262968 A1 | 11/2007 | Ohshita et al. |
| 2007/0268261 A1 | 11/2007 | Lipson |
| 2007/0268270 A1 | 11/2007 | Onodera et al. |
| 2007/0273671 A1 | 11/2007 | Zadesky et al. |
| 2007/0276525 A1 | 11/2007 | Zadesky et al. |
| 2008/0042987 A1 | 2/2008 | Westerman et al. |
| 2008/0062144 A1 | 3/2008 | Shahoian et al. |
| 2008/0062625 A1 | 3/2008 | Batio |
| 2008/0068348 A1 | 3/2008 | Rosenberg et al. |
| 2008/0068349 A1 | 3/2008 | Rosenberg et al. |
| 2008/0068350 A1 | 3/2008 | Rosenberg et al. |
| 2008/0068351 A1 | 3/2008 | Rosenberg et al. |
| 2008/0088596 A1 | 4/2008 | Prest et al. |
| 2008/0088597 A1 | 4/2008 | Prest et al. |
| 2008/0088600 A1 | 4/2008 | Prest et al. |
| 2008/0174449 A1 | 7/2008 | Schmidt et al. |
| 2008/0202824 A1 | 8/2008 | Philipp et al. |
| 2008/0239168 A1 | 10/2008 | Henty |
| 2008/0284738 A1 | 11/2008 | Hovden et al. |
| 2008/0291074 A1 | 11/2008 | Tzeng et al. |
| 2008/0303799 A1 | 12/2008 | Schwesig et al. |
| 2009/0046068 A1 | 2/2009 | Griffin |
| 2009/0046069 A1 | 2/2009 | Griffin et al. |
| 2009/0046070 A1 | 2/2009 | Griffin |
| 2009/0046071 A1 | 2/2009 | Griffin |
| 2009/0109332 A1 | 4/2009 | Lin |
| 2009/0128501 A1 | 5/2009 | Lazaridis et al. |
| 2009/0135145 A1 | 5/2009 | Chen et al. |
| 2009/0149223 A1 | 6/2009 | Friedman et al. |
| 2009/0185081 A1 | 7/2009 | Ueno et al. |
| 2009/0219260 A1 | 9/2009 | Bick |
| 2009/0225052 A1 | 9/2009 | Liu |
| 2009/0244011 A1 | 10/2009 | Ching |
| 2009/0244012 A1 | 10/2009 | Behar et al. |
| 2009/0244402 A1* | 10/2009 | Rye et al. ............ 348/734 |
| 2009/0244832 A1 | 10/2009 | Behar et al. |
| 2009/0275366 A1 | 11/2009 | Schilling |
| 2009/0300511 A1 | 12/2009 | Behar et al. |
| 2009/0303676 A1 | 12/2009 | Behar et al. |
| 2009/0322790 A1 | 12/2009 | Behar et al. |
| 2010/0052870 A1 | 3/2010 | King |
| 2010/0053854 A1 | 3/2010 | Nishikawa et al. |
| 2010/0079403 A1 | 4/2010 | Lynch et al. |
| 2010/0079404 A1 | 4/2010 | Degner et al. |
| 2010/0090968 A1 | 4/2010 | Lee et al. |
| 2010/0097357 A1 | 4/2010 | Lin |
| 2010/0099394 A1 | 4/2010 | Hainzl |
| 2010/0103127 A1 | 4/2010 | Park et al. |
| 2010/0103128 A1 | 4/2010 | Chang et al. |
| 2010/0103129 A1 | 4/2010 | Ling et al. |
| 2010/0103611 A1 | 4/2010 | Yang et al. |
| 2010/0105441 A1 | 4/2010 | Voss et al. |
| 2010/0128002 A1 | 5/2010 | Stacy et al. |
| 2010/0137033 A1 | 6/2010 | Lee |
| 2010/0149127 A1 | 6/2010 | Fisher et al. |
| 2010/0149432 A1 | 6/2010 | Roberts et al. |
| 2010/0156814 A1 | 6/2010 | Weber et al. |
| 2010/0172080 A1 | 7/2010 | Bestle |
| 2010/0174993 A1 | 7/2010 | Pennington et al. |
| 2010/0225813 A1 | 9/2010 | Hirono et al. |
| 2010/0245667 A1 | 9/2010 | Hardacker et al. |
| 2011/0025696 A1 | 2/2011 | Wyatt et al. |

FOREIGN PATENT DOCUMENTS

| | | |
|---|---|---|
| KR | 1020000036647 A | 7/2000 |
| TW | 434606 | 5/2001 |
| TW | 200931302 | 7/2007 |
| TW | 200736976 | 10/2007 |
| TW | 200741508 | 11/2007 |
| TW | 200741525 | 11/2007 |
| TW | 200925962 | 10/2008 |
| TW | M343208 | 10/2008 |
| TW | 200910150 | 3/2009 |
| TW | 200910173 | 3/2009 |
| TW | 200912716 | 3/2009 |
| TW | 200913644 | 3/2009 |
| TW | M355425 | 4/2009 |
| TW | M366715 | 5/2009 |
| TW | 200923736 | 6/2009 |
| TW | 200923753 | 6/2009 |
| TW | 200923754 | 6/2009 |
| TW | 200925960 | 6/2009 |
| TW | 200928905 | 7/2009 |
| TW | 200928922 | 7/2009 |
| TW | 200939086 | 9/2009 |
| TW | 200939091 | 9/2009 |
| TW | 200939092 | 9/2009 |
| TW | 200943150 | 10/2009 |
| TW | 200947283 | 11/2009 |
| TW | 201003472 | 1/2010 |
| TW | M374101 | 2/2010 |
| TW | 201011610 | 3/2010 |
| TW | M377644 | 4/2010 |
| TW | 201017488 | 5/2010 |
| WO | 0235461 A1 | 5/2002 |

(56) References Cited

FOREIGN PATENT DOCUMENTS

| WO | 2004107146 A2 | 12/2004 |
| WO | 2009123931 A1 | 10/2009 |
| WO | 2009146070 A1 | 12/2009 |

OTHER PUBLICATIONS http://laptop.org/en/laptop/start/ebook.shtml accessed on Sep. 29, 2008.

Office Action dated Jul. 9, 2010.
Office Action dated Apr. 4, 2011.
Office Action dated Jan. 31, 2011.
International Search Report for PCT/US2011/057313 mailed Mar. 6, 2012.
International Search Report for PCT/US2011/057308 mailed Mar. 8, 2012.
Office Action dated Aug. 19, 2014, U.S. Appl. No. 12/910,329.

* cited by examiner

CONFIGURABLE COMPUTER SYSTEM

RELATED APPLICATION

This application is a continuation-in-part of co-pending U.S. Design application Ser. No. 29/361,526, entitled "SLIDEABLY OPENABLE REMOTE CONTROL DEVICE FOR A COMPUTER OR OTHER ELECTRONIC DEVICE," filed May 12, 2010, which is hereby incorporated by reference in its entirety.

BACKGROUND OF THE DISCLOSURE

1. Field of the Invention

Aspects of the present invention relate generally to computer systems that are connected to a television and used for viewing television signal information and Internet information.

2. Discussion of Related Art

With the public's ever increasing desire for greater access to varying multimedia outlets, users oftentimes wish for different media outlets to be integrated. For example, common integrated media outlets may include mobile television (e.g., access to a television broadcast signal through a mobile device such as a mobile phone) and mobile Internet (e.g., access to the Internet through a mobile device such as a mobile phone).

Another example of integrated multimedia outlets includes the use of an external display (e.g., a television, LCD or projector) to present output display signals from a computer system. For instance, due to the location of a user or the configuration of the user's computer system, a user may desire to utilize an external display, such as a television, rather than a standard computer monitor, to view the output display signals of a computer system. In such a situation, the output display signals of the computer system are typically sent to the external display over an electrical connection, such as the well-known Separate Video (S-Video), component video, or High Definition Multimedia Interface (HDMI) connections.

SUMMARY

Aspects in accord with the present invention are directed to computer systems that are connected to an external display device, such as a television, and used for viewing television signal information and Internet information.

In typical configurations where a computer system is connected to an external display device, such as a television, certain compatibility problems may arise. For example, one problem which may arise is that the external display device is configured to display one type of signal (e.g., television broadcast signals) and is not configured to display output display signals from the computer system. Another problem which may arise is that the signals sent by the computer system are configured to be displayed on a computer screen or monitor viewed from a relatively short distance from the screen and not on an external display device viewed from a greater distance. Finally, an additional problem with connecting a computer system to an external display device, such as a television, is that the controls of the computer system may not be configured adequately to interact efficiently with the display shown on the external display device.

As such, the present invention provides a computer system capable of being coupled to an external display device, such as a television, that provides efficient control of the computer system through the external display device, and reduces problems with external display device/computer system compatibility, as discussed above.

In one aspect the present invention features a method of optimizing output display signals from a computer system. The method may comprise acts of providing an interface in the computer system adapted to be connected to an external display device, and providing a controller in the computer system adapted to transmit output display signals to the external display device, wherein the output display signals are configured to generate a user interface displayed on the external display device, receive, from the external display device, external display device identification information, determine, in response to receiving the external display device identification information, whether the external display device was previously connected to the computer system, and in response to determining that the external display device was previously connected to the computer system, automatically configure a layout of the user interface to display within a previously defined display area of the external display device and automatically compensate the layout of the user interface for a previously defined overscan region of the external display device.

According to one embodiment of the present invention, the controller is further adapted to automatically initiate, in response to determining that the external display device was not previously connected to the computer system, an overscan wizard displayed on the external display device, and permit a user, upon initiating the overscan wizard, to define an appropriate boundary of the display area of the external display device.

According to another embodiment of the present invention, the controller is further adapted to automatically adjust, in response to the user defining the appropriate boundaries of the display area, a layout of the user interface to fit entirely within the appropriate boundary of the display area of the external display device.

According to one embodiment of the present invention, the controller is further adapted to receive display capability information related to the external display device, and automatically configure the layout of the user interface in response to receiving the display capability information.

According to another embodiment of the present invention, the controller is further adapted to automatically configure the user interface to display within a zoomed in display area of the external display device. In one embodiment of the present invention, the controller is further adapted to automatically enlarge a cursor configured to be displayed within the display area of the external display device.

In another aspect the present invention features a computer system. The computer system may comprise a base station configured to be coupled to an external network and to communicate with the external network, an external display device coupled to the base station and configured to receive output display signals from the base station, and a user interface displayed on the external display device and generated in response to the output display signals from the base station, wherein the base station is configured to receive an external display device identification signal from the external display device, determine whether the base station has been coupled to the external display device before, and in response to a determination that the base station has not been coupled to the external display device before, automatically initiating an overscan wizard displayed on the external display device to permit a user to define an acceptable display boundary of the external display device.

According to one embodiment of the present invention, in response to a determination that the base station has been coupled to the external display device before, the base station automatically configures the user interface to display within a pre-defined display boundary associated with the previously connected external display device.

According to another embodiment of the present invention, the user interface includes zoomed in information. In one embodiment of the present invention, the external display device is a television. In another embodiment of the present invention, the base station is configured to be coupled to the television via an HDMI connection.

According to one embodiment of the present invention, the user interface includes an enlarged cursor, operable by a user to interact with the user interface. In one embodiment of the present invention, the user interface includes header information, wherein the header information is configured to be hidden when not selected by the cursor. In another embodiment of the present invention, the user interface includes at least one system information message, wherein in response to the at least one system information message being displayed, the cursor is configured to automatically focus on the system message.

According to another embodiment of the present invention, the user interface includes an enlarged first text field and a second text field, wherein the enlarged first text field is configured to mirror the second text field and to be displayed when a user enters text into the second text field.

In one aspect the present invention features a computer system. The computer system may comprise a base station configured to be coupled to an external network and to communicate with the external network, an external display device coupled to the base station and configured to receive output display signals from the base station, a user interface displayed on the external display device and generated in response to the output display signals from the base station, and a means for optimizing the user interface to be adequately displayed on the external display device.

According to one embodiment of the present invention, the means for optimizing includes a means for automatically configuring the user interface based on display capability information sent from the external display device to the base station. In one embodiment of the present invention, the means for optimizing includes a means for determining an overscan region of the external display device and in response, compensating the external display device.

According to another embodiment of the present invention, the computer system further comprises a means for determining that the external display device has previously been coupled to the base station and a means for automatically configuring the user interface based on display capability information of the previously connected external display device.

In another aspect the present invention features a non-transitory computer-readable medium comprising computer-executable instructions that, when executed on a processor, perform a method for optimizing output display signals from a computer system, the method comprising acts of providing an interface in the computer system adapted to be connected to an external display device, and providing a controller in the computer system adapted to transmit output display signals to the external display device, wherein the output display signals are configured to generate a user interface displayed on the external display device, receive, from the external display device, external display device identification information, determine, in response to receiving the external display device identification information, whether the external display device was previously connected to the computer system, and in response to determining that the external display device was previously connected to the computer system, automatically configure a layout of the user interface to display within a previously defined display area of the external display device and automatically compensate the layout of the user interface for a previously defined overscan region of the external display device.

In one aspect the present invention features a remote control for operating a computer system. The remote control may comprise a housing comprising a first housing portion and a second housing portion, wherein the first housing portion is coupled to the second housing portion and is configurable in at least two positions in relation to the second housing portion, a touchpad coupled to the first housing portion, a keypad coupled to the second housing portion, a processor located within the housing and operatively coupled to both the touchpad and the keypad, the processor being configured to receive control signals from the touch pad and the keypad, and an RF transmitter coupled to the processor and configured to transmit signals from the processor to the computer system, wherein, in a first configuration of the remote control, the first housing portion is configured to be manipulated to a first position in relation to the second housing portion and the remote control is configured to operate in a first mode of operation, and wherein, in a second configuration of the remote control, the first housing portion is configured to be manipulated to a second position in relation to the second housing portion, and wherein the remote control is configured to operate in a second mode of operation.

According to one embodiment of the present invention, the first housing portion is slideably coupled to the second housing portion, wherein, in the first configuration, the first housing portion is configured to be slid to the first position in relation to the second housing portion, and wherein, in the second configuration, the first housing portion is configured to be slid to the second position in relation to the second housing portion. In one embodiment of the present invention the first housing portion is configured to be slid to the first position so as to limit access to the keypad. In another embodiment of the present invention the first housing portion is configured to be slid to the second position so as to provide access to the keypad and the touchpad.

According to another embodiment of the present invention, the touchpad is configured to provide a first set of control signals to the processor in response to the remote control being operated in the first mode of operation, and wherein the touchpad is configured to provide a second set of control signals to the processor in response to the remote control being operated in the second mode of operation. In one embodiment of the present invention, the touchpad includes a depressible switch.

According to one embodiment of the present invention, the remote control further comprises a mechanical flag coupled to the first housing portion, the second housing portion and the processor, wherein the mechanical flag is configured to send a configuration signal to the processor indicating whether the remote control is in the first or second configuration and wherein the RF transmitter is configured to transmit the configuration signal to the computer system.

According to another embodiment of the present invention, the remote control further comprises a motion sensor coupled to the processor, wherein the motion sensor is configured to provide motion signals to the processor indicating any movement of the remote control, and wherein the RF transmitter is configured to transmit the motion signals to the computer system. In one embodiment of the present invention, the motion sensor is an accelerometer According to one embodiment of the present invention, the remote control further comprises a microphone coupled to the processor, wherein the microphone is configured to receive external audio signals and to provide the external audio signals to the processor, and wherein the RF transmitter is configured to transmit the external audio signals to the computer system.

According to another embodiment of the present invention, the remote control further comprises a power module coupled to the processor, wherein the power module is configured to provide power to the processor, wherein the power module is configured to provide a power signal to the processor indicating an amount of available power remaining stored in the power module and wherein the RF transmitter is configured to transmit the power signal to the computer system.

According to one embodiment of the present invention, the keypad includes at least one dedicated button, wherein the at least one dedicated button is configured to send a dedicated signal to the processor, the dedicated signal being configured to automatically initiate a pre-defined function of the computer system, and wherein the RF transmitter is configured to transmit the dedicated signal to the computer system, In another aspect the present invention features a method for operating a remote control configured to communicate with a computer system. The method may comprise acts of pairing the remote control with the computer system, manipulating the remote control to one of a plurality of configurations, transmitting a configuration status bit, indicating the current configuration of the remote control, to the computer system in response to the act of manipulating, and operating the remote control in one of a plurality of modes in response to the act of manipulating.

According to one embodiment of the present invention, the act of pairing comprises transmitting an initial pairing request signal from the remote control to the computer system, requesting, by the computer system in response to the initial pairing request, that the remote control resend a pairing request at a reduced signal strength, transmitting a reduced strength pairing request signal from the remote control to the computer system, determining whether the computer system receives the reduced strength pairing request, and in response to the computer system receiving the reduced strength pairing request, exchanging communication information between the remote control and the computer system.

According to another embodiment of the present invention, the act of manipulating comprises selectively sliding a first portion of the remote control to either a first or second position, and wherein the act of operating comprises operating the remote control in a first mode in response to the first portion of the remote control being slid to the first position and operating the remote control in a second mode in response to the first portion of the remote control being slid to the second position.

According to one embodiment of the present invention, the method further comprises acts of supplying the remote control with power from a power module, determining an amount of power stored in the power module, and transmitting a power status bit to the computer system, the power status bit indicating the amount of power stored in the power module.

According to another embodiment of the present invention, the method further comprises acts of transmitting a firmware status bit, from the remote control to the computer system, wherein the firmware status bit indicates a status of firmware stored on the remote control, determining, in response to the firmware status bit, whether the firmware of the remote control requires updating, determining, in response to the power status bit, whether the amount of power stored in the power module is adequate to power a firmware update, and in response to the firmware status bit indicating that a firmware update is required and in response to the power status bit indicating that the power stored in the power module is adequate, initiating a firmware update. In one embodiment of the present invention, the act of initiating a firmware update comprises, transmitting a firmware update status bit, from the remote control to the computer system, indicating that a firmware update is in progress, receiving updated firmware from the computer system, updating the firmware of the remote control, and operating the remote control from protected memory, located within the remote control, until receiving an indication from the computer system that the firmware update has been successfully completed.

In one aspect the present invention features a remote control for operating a computer system, the remote control comprising a housing, a touchpad coupled to the housing, a keypad coupled to the housing, a processor within the housing coupled to the touchpad and the keypad and configured to receive control signals from the touch pad and the keypad, an RF transmitter coupled to the processor and configured to transmit control signals from the processor to the computer system, and means for manipulating the remote control into a plurality of configurations, the current configuration of the remote control determining an operational mode of the remote control.

In another aspect the present invention features a non-transitory computer-readable medium comprising computer-executable instructions that, when executed on a processor, perform a method for operating a remote control configured to communicate with a computer system, the method comprising acts of pairing the remote control with the computer system, manipulating the remote control to one of a plurality of configurations, transmitting a configuration status bit, indicating the current configuration of the remote control, to the computer system in response to the act of manipulating, and operating the remote control in one of a plurality of modes in response to the act of manipulating.

In one aspect the present invention features a computer system. The computer system may comprise a base station having a communication interface adapted to communicate with an external network, an external display device coupled to the base station and configured to receive output display signals from the base station, a user interface displayed on the external display device and generated in response to the output display signals, wherein the user interface is selectively configurable in one of a plurality of modes of content, and a remote control configured to communicate with the base station and to permit a user to interact with the user interface displayed by the external display device, wherein the remote control is selectively operable in at least two configurations and wherein the selectively operable remote is configured to permit a user to select for display on the external display device one of the plurality of modes of content of the user interface based on the selected configuration of the remote control.

According to one embodiment of the present invention the remote control is configured to communicate wirelessly with the base station. In one embodiment of the present invention the remote control includes a Radio Frequency (RF) transmitter configured to communicate with the base station.

According to another embodiment of the present invention, the remote control comprises a first portion, and a second portion slideably coupled to the first portion, wherein the first portion is configured to be manipulated into a first position, relative to the second portion, in a first configuration of the remote control, and wherein the first portion is configured to be manipulated into a second position, relative to the second portion, in a second configuration of the remote control. In one embodiment of the present invention, the user interface is configured to display a first mode of content in response to the first portion being manipulated into the first position, and wherein the user interface is configured to display a second mode of content in response to the first portion being manipulated into the second position. In another embodiment of the present invention, the user interface is configured to display a streamlined mode of content in response to the first portion being manipulated into the second position.

According to one embodiment of the present invention, the external display device is a television. In one embodiment of the present invention, the base station is connected to the television via a High Definition Multimedia Interface (HDMI) connection. In another embodiment of the present invention, the base station is configured to receive television identification information from the television via the HDMI connection. In one embodiment of the present invention, the base station is configured to receive display capability information from the television via the HDMI connection.

In another aspect the present invention features a non-transitory computer-readable medium comprising computer-executable instructions that, when executed on a processor, perform a method for controlling a computer system, the computer system comprising a base station coupled to an external network and an external display device coupled to the base station, the method comprising acts of communicating with the external network via the base station, transmitting output display signals from the base station to the external display device in response to the act of communicating, generating a user interface on the external display device in response to the output display signals, interacting with the user interface through a remote control, manipulating the remote control into a first configuration, and configuring the user interface into a first mode of content in response to the act of manipulating the remote control into a first configuration.

In one aspect the present invention features a method of controlling a computer system, the computer system comprising a base station coupled to an external network and an external display device coupled to the base station, wherein the method comprises acts of communicating with the external network via the base station, transmitting output display signals from the base station to the external display device in response to the act of communicating, generating a user interface on the external display device in response to the output display signals, interacting with the user interface through a remote control, manipulating the remote control into a first configuration, and configuring the user interface into a first mode of content in response to the act of manipulating the remote control into a first configuration.

According to one embodiment of the present invention, the method further comprises acts of manipulating the remote control into a second configuration and configuring the user interface into a second mode of content in response to the act of manipulating the remote control into a second configuration. In one embodiment of the present invention, the act of configuring the user interface into a first mode of content includes configuring the user interface into a streamlined mode of content.

According to another embodiment of the present invention, the method further comprises connecting the base station to the external display device, receiving, from the external display device, display capability information, and configuring the user interface in response to the act of receiving.

According to one embodiment of the present invention, the act of manipulating the remote control into a first configuration includes sliding a portion of the remote control into a first position and wherein the act of manipulating the remote control into a second configuration includes sliding the portion of the remote control into a second position.

In another aspect the present invention features a computer system. The computer system may comprise a base station configured to be coupled to an external network and to send and receive signals from the external network, an external display device coupled to the base station and configured to receive output display signals from the base station, a user interface displayed on the external display device and generated in response to the output display signals, wherein the user interface is selectively configurable in one of a plurality of modes of content, and a means for communicating with and controlling the base station, wherein the means permits a user to select for display on the external display device one of the plurality of modes of content of the user interface.

According to one embodiment of the present invention, the means for communicating with and controlling the base station includes a means for communicating wirelessly with the base station. In one embodiment of the present invention, the computer system further comprises a means for receiving display capability information from the external display device.

In one aspect the present invention features a computer system. The computer system may comprise a base station having a first communication interface adapted to communicate with an external network and a second communication interface adapted to be coupled to an external display device, wherein the second communication interface is further adapted to transmit output display signals to the external display device, wherein the output display signals are configure to generate a user interface for display on the external display device, and wherein the user interface is selectively configurable in one of a plurality of modes of content, and a remote control configured to communicate with the base station and to permit a user to interact with the user interface displayed by the external display device, wherein the remote control is selectively operable in at least two configurations and wherein the selectively operable remote is configured to permit a user to select for display on the external display device one of the plurality of modes of content of the user interface based on the selected configuration of the remote control.

BRIEF DESCRIPTION OF DRAWINGS

The accompanying drawings are not intended to be drawn to scale. In the drawings, each identical or nearly identical component that is illustrated in various FIGs. is represented by a like numeral. For purposes of clarity, not every component may be labeled in every drawing. In the drawings.

DETAILED DESCRIPTION OF THE PREFERRED EMBODIMENTS

Figure 1:
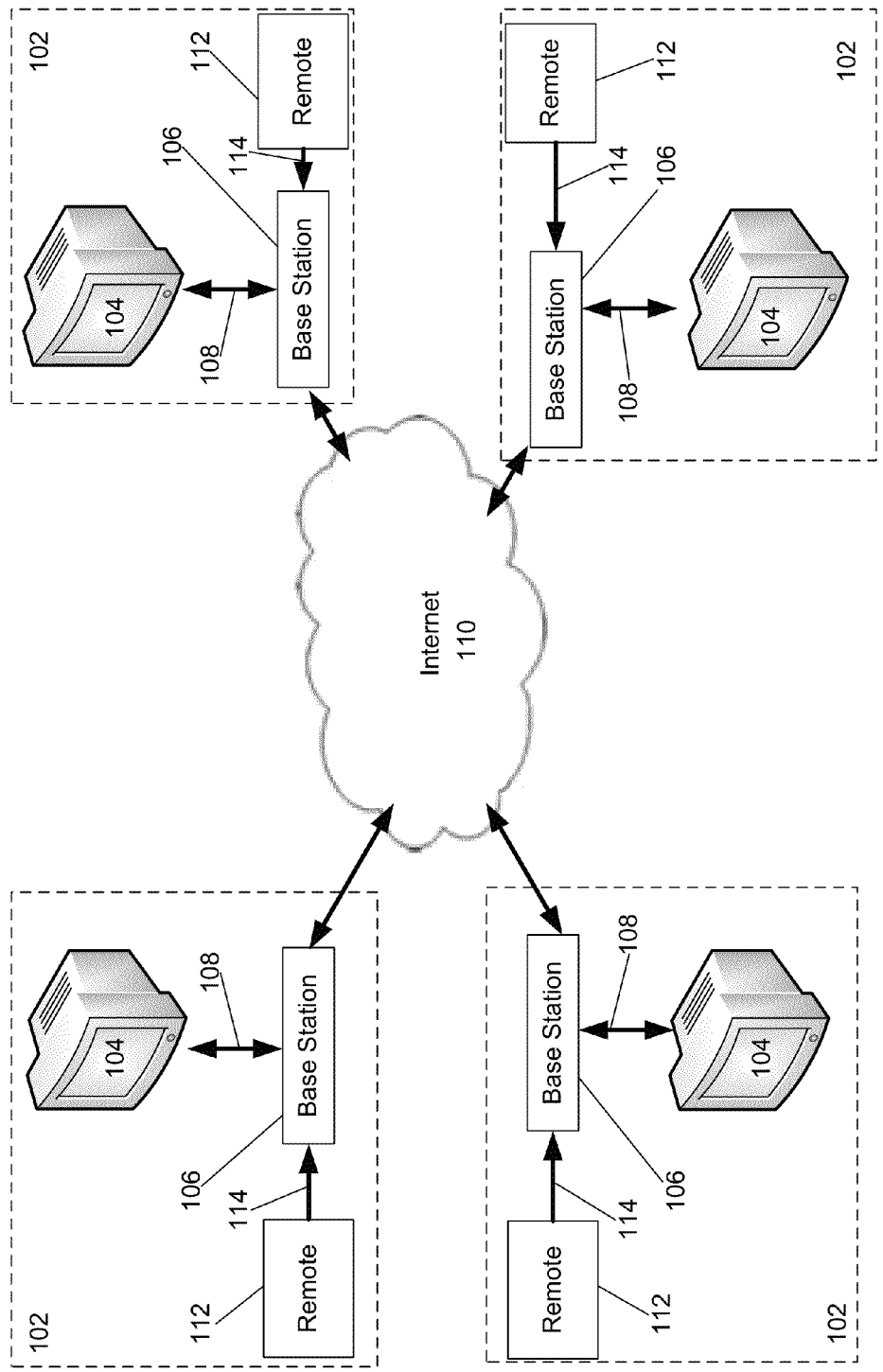
FIG. 1 is a block diagram of a computer system in accordance with aspects of at least one embodiment of the present invention.

For the purposes of illustration only, and not to limit the generality, the present disclosure will now be described in detail with reference to the accompanying figures. This disclosure is not limited in its application to the details of construction and the arrangement of components set forth in the following description or illustrated in the drawings. The disclosure is capable of other embodiments and of being practiced or being carried out in various ways. Also the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

As described above, in certain situations, it may be desired for a computer system to be connected to an external display, such as a television. In such a situation, certain problems may arise. One problem which may arise is that the external display device is configured to display one type of signal (e.g., television broadcast signals) and is not configured to display output display signals from a computer system.

For example, many televisions designed for displaying broadcast video content use a technique called "overscan" to crop the edges of the picture region, which historically contain artifacts not meant to be seen by the viewer. If connected to a computer system, a television using the overscan technique may crop the edges of the picture region of the computer system display and lose information meant to be displayed at the edges of the picture region of the computer system.

In addition, many High Definition (HD) televisions have an HD standard aspect ratio of 16:9 (e.g., either 1280×720 or 1920×1080), and this ratio is oftentimes different than that of the computer screen or monitor of the computer system coupled to the television (e.g., a typical computer screen or monitor may have a resolution of 1280×800). Thus, for example, it is appreciated that a television with a resolution of 1280×720, coupled to a computer system configured to display on a screen with a resolution of 1280×800, may not be able to display all of the information intended by the computer system.

Another problem which may arise is that the signals sent by the computer system are configured to be displayed on a computer screen or monitor viewed from a relatively short distance from the screen. According to one aspect, it is appreciated that computer signals are not typically configured to be displayed on an external display device, such as a television, that is viewed from a greater distance. For example, the size of the information (e.g., text, images, cursor etc.) sent by the computer system to the external display device are intended to be displayed on a relatively small computer screen or monitor and viewed by a user from a distance relatively close to the screen. However, when displayed on a relatively large external display device viewed from a distance, the information sent by the computer may appear small and be difficult to read, making interaction with the computer system potentially more complicated.

An additional problem with connecting a computer system to an external display device, such as a television, is that the controls of the computer system may not be configured adequately to interact efficiently with the display shown on the external display device. For example, typical controls of a computer system (e.g., a keyboard mouse, trackball etc.) are designed to interact efficiently with a computer system while a user is sitting in front of the computer system (e.g., at the hard surface of a desk). However, these same controls may be inadequate when a user is attempting to interact with the computer system while viewing the television from a distance, as the user may not be sitting at a desk or even have a hard surface in front of them.

As such, the present invention provides a computer system capable of being coupled to an external display device, such as a television, that provides efficient use of the computer system through the external display device, and reduces problems with external display device/computer system compatibility, as discussed above.

FIG. 1 illustrates a block diagram of a system 100 according to at least one embodiment of the present invention. The system 100 includes a plurality of hosts 102. Each host 102 includes an external display device 104, such as a television, LCD screen or projector screen, capable of displaying video signals. Each external display device 104 is connected to a base station 106. According to one embodiment, the external display device 104 and the base station 106 are connected via an HDMI connection; however, it is to be appreciated that the external display device 104 and the base station 106 may be connected via any other type of video connection (e.g., an S-Video or component video connection). Each base station 106 is coupled to an external network 110. For example, according to one embodiment, each base station 106 may be coupled to the Internet via an IP based Ethernet connection. Also, according to another embodiment, each base station 106 may be coupled to a cloud of a cloud network via the Internet. The operation of the base station 106 will be discussed in greater detail below.

Each host 102 also includes a remote control 112 capable of controlling the operation of the base station 106. According to one embodiment, the remote control 112 is configured to communicate with the base station 106 via Radio Frequency (RF) wireless signals 114 (e.g., a Bluetooth wireless connection); however, it is to be appreciated that the remote control 112 may be configured to communicate with the base station 106 over any type of communication method (e.g., over an infrared connection or even a hardwired connection). The operation of the remote control 112 will be discussed in greater detail below.

Figure 2:
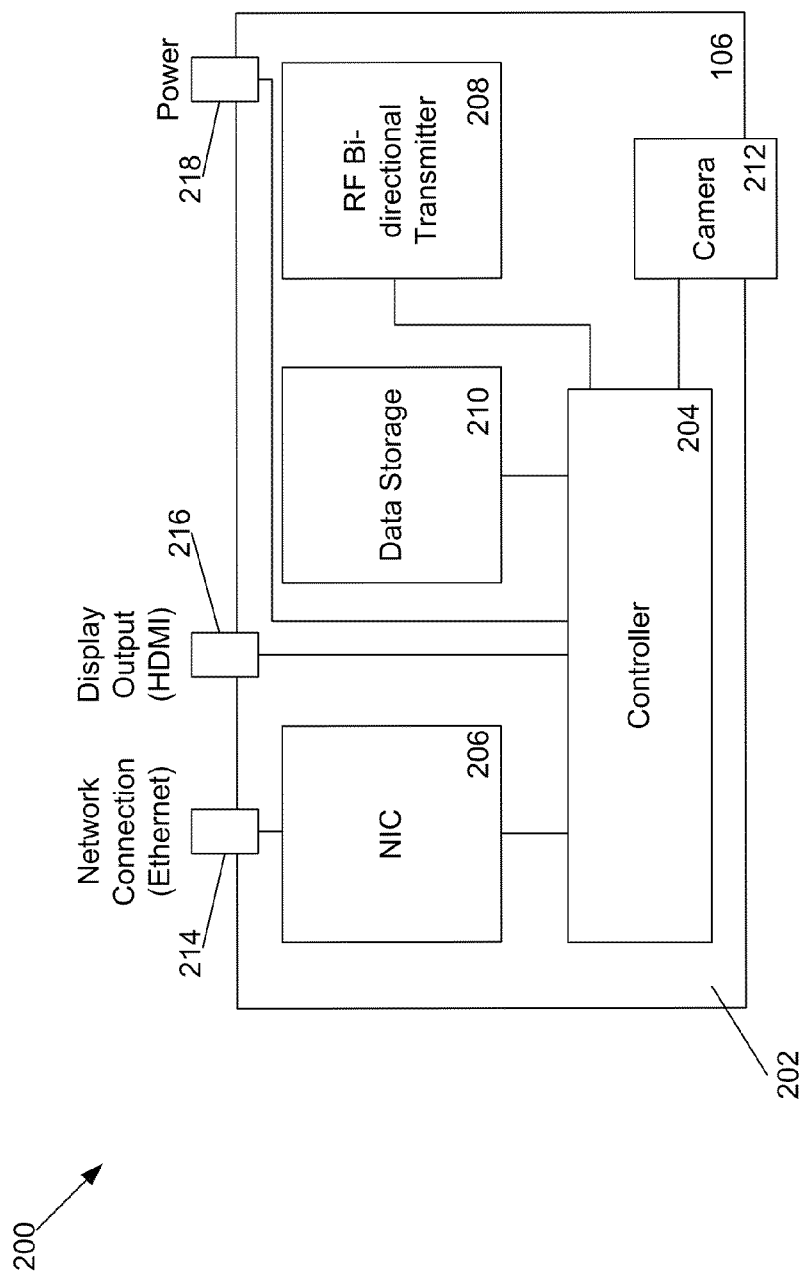
FIG. 2 is a block diagram of a base station in accordance with aspects of at least one embodiment of the present invention.

FIG. 2 illustrates a block diagram 200 of the base station 106 according to at least one embodiment of the present invention. According to one embodiment, base station 106 includes a housing 202. Within housing 202, the base station 106 includes a controller 204 configured to manage the operation of the base station 106. Coupled to the controller 204 are a Network Interface Card (NIC) 206, an RF bi-directional transmitter 208 and data storage 210. According to one embodiment, an antenna (not shown) is also coupled to the RF bi-directional transmitter 208. The base station 106 may also include a camera 212, coupled to the controller 204 and protruding from the base station 106. In addition, the base station 106 may also include a plurality of connections or interfaces. For instance, base station 106 may include an Ethernet connection 214 coupled to the NIC and configured to be coupled to a network 110 (e.g., the Internet), a display output connection 216 (e.g., an HDMI connection) coupled to the controller 204 and configured to provide output display signals to an external display device 104 (e.g., a television, projector, LCD screen etc.), and a power connection 218 coupled to the controller 204 and configured to be connected to a power supply (not shown) (e.g., a utility system). Base station 106 may include other interface types.

According to one embodiment, the NIC 206 is configured to be coupled to a network (e.g., to the Internet via the Ethernet connection 214) and to send/receive signals from the network. According to another embodiment, the RF bi-directional transmitter 208 may be configured (via the antenna) to transmit RF signals to, and receive wireless RF signals from, an external device (e.g., from the remote control 112). In one embodiment, the RF bi-directional transmitter is a half-duplex transmitter in that the transmitter can both transmit and receive signals, but not at the same time. According to one embodiment, the RF signals transmitted and received by the RF bi-directional transmitter 208 may be short-range Bluetooth RF signals operating at 2.4 GHz; however, it is to be appreciated that the RF signals transmitted and received by the bi-directional transmitter 208 may be any other type of RF signal (e.g., Wi-Fi signals). According to one embodiment, the camera 212 is a digital camera configured to capture video images (e.g., of a user operating the base station 116).

As discussed above, the base station 106 may include a controller 204 configured to manage the operation of the base station 106. Using data stored in associated memory, the controller 204 performs one or more instructions that may result in manipulated data, and the controller 204 monitors and controls operation of the base station 106. In some examples, the controller 204 may include one or more processors or other types of controllers. In one example, the controller 204 is a commercially available, general purpose processor. In another example, the controller 204 performs a portion of the functions disclosed herein on a general purpose processor and performs another portion using an application-specific integrated circuit (ASIC) tailored to perform particular operations. As illustrated by these examples, examples in accordance with the present invention may perform the operations described herein using many specific combinations of hardware and software and the invention is not limited to any particular combination of hardware and software components.

The data storage 210 may include a computer readable and writeable nonvolatile storage medium in which instructions are stored that define a program to be executed by the controller 204. The data storage 210 also may include information that is recorded, on or in, the medium, and this information may be processed by the program. More specifically, the information may be stored in one or more data structures specifically configured to conserve storage space or increase data exchange performance. The instructions may be persistently stored as encoded signals, and the instructions may cause a processor to perform any of the functions described herein. The medium may, for example, be optical disk, magnetic disk or flash memory, among others. In operation, the controller 204, or some other controller may cause data to be read from the nonvolatile recording medium into another memory (not shown) that allows for faster access to the information by the controller 204 than does the storage medium included in the data storage 210. The memory may be located in the data storage 210 or somewhere else. The controller 204 may manipulate the data within the memory, and then copy the data to the medium associated with the data storage 210 after processing is completed. A variety of components may manage data movement between the medium and the memory, and the invention is not limited thereto. According to one embodiment, the computer-readable medium may be non-transitory in that the computer-executable instructions may be stored permanently or semi-permanently on the medium.

Figure 3:
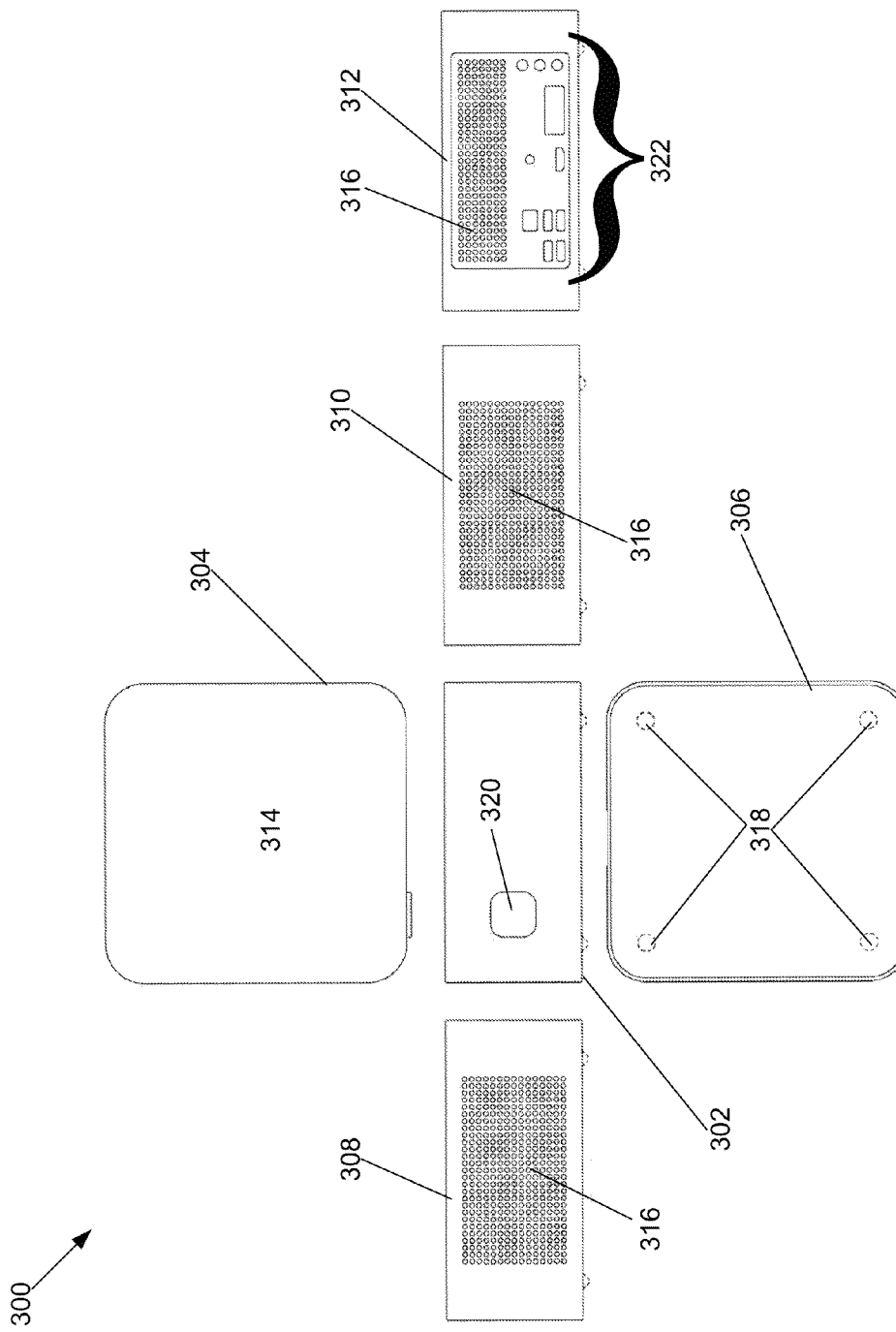
FIG. 3 is an external schematic diagram of a base station in accordance with aspects of at least one embodiment of the present invention.

FIG. 3 illustrates an external schematic diagram 300 of the base station 106 according to at least one embodiment of the present invention. The base station 106 comprises a housing 314. FIG. 3 illustrates views of a front side 302, top side 304, bottom side 306, left hand side 308, right hand side 310, and back side 312 of the base station 106. On the back side 312 of the base station 106, a plurality of input/output connections 322 are provided. In one embodiment, the plurality of input/output connections 322 includes at least one Universal Serial Bus (USB) connection, an Ethernet connection, a power connection, a sound input connection, a sound output connection, a microphone input connection and a Video Graphics Array (VGA) connection. However, it is to be appreciated that any number and any type of input/output connections may be positioned at any location on the housing 314 of the base station 106.

According to one embodiment, the left side 308, right side 310 and back side 312 include ventilation holes 316 configured to prevent overheating of the base station 106. According to another embodiment, the bottom side 306 of the base station 106 may also include ventilation holes (not shown). In one embodiment, the bottom side 306 includes a plurality of legs 318 configured to support the base station 106 when the base station 106 is placed on a hard surface. According to one embodiment, the front side 302 of the base station includes a power button 320 coupled to the processor 204 and configured to selectively power on and off the base station 106. According to another embodiment, the front side 302 of the base station includes an indicator light (not shown) coupled to the processor 203 and configured to indicate the operational status of the base station 106.

According to one embodiment, the base station 106, as illustrated in FIGS. 2-3, is configured to be coupled to an external display device 104 such as a television 104, via a video display output 216 and coupled to an external network 110 (e.g., the Internet), via an Ethernet network connection 214. According to one embodiment, the video display output 216 includes an HDMI connection. The base station 106 is also configured to be coupled to a power source (e.g., utility power) via the power connection 218. According to one embodiment, the base station 106 is intended to be placed adjacent to the television 104 (e.g., on top of the television 104); however, it is to be appreciated that the base station 106 may be located anywhere as long as its connections to the Internet 110 and the television 104 are maintained and the base station 106 is able to communicate with the remote control 112.

Once the base station 106 is powered, coupled to the television 104, and coupled to the Internet 110, the base station may be operated by a user to perform typical computer related tasks such as retrieve email, watch online video content, chat, browse the web, etc. According to one embodiment, the base station 106 may be configured and operated to provide a system and method for user interaction as described in U.S. patent application Ser. No. 12/416,479 entitled "SYSTEM AND METHOD FOR STREAMLINING USER INTERACTION WITH ELECTRONIC CONTENT," filed on Apr. 1, 2009, which is herein incorporated by reference in its entirety.

For example, according to one embodiment, the base station 106 may accept electronic content (e.g., email, video, websites, text, audio, etc.) over the Internet 110 (via the Ethernet connection 214), present the electronic content to a user through a graphical user display (displayed on the television 104 via the display output 216), and permit the user to interact with the electronic content using at least one I/O device (e.g., the remote 112). The base station 106 may also be configured to organize the graphical user display into a map based user interface and enable the map based user interface to permit interaction with electronic content through the at least one I/O device. According to one embodiment, the map based user interface provides a clear overview of the entire computing environment and searching capability within the environment that may be accessed using the at least one I/O device.

According to one embodiment, the base station 106 is also configured to display the mapped online digital content as a streamlined representation. In one embodiment, the streamlined representation is a hierarchical representation that reduces the number of items to select amongst at any stage of navigation, thereby facilitating user access with the at least one I/O device. For example, according to one embodiment, the streamlined representation comprises at least one card associated with the mapped online digital content. The at least one card is configured to render selectable options customized to the at least one I/O device. In one embodiment, the streamlined representation comprises a plurality of cards. Through the use of the I/O device, cards and the graphical user display, a user may be able to operate the base station 106 and interact with content displayed on the television 104.

Figure 4:
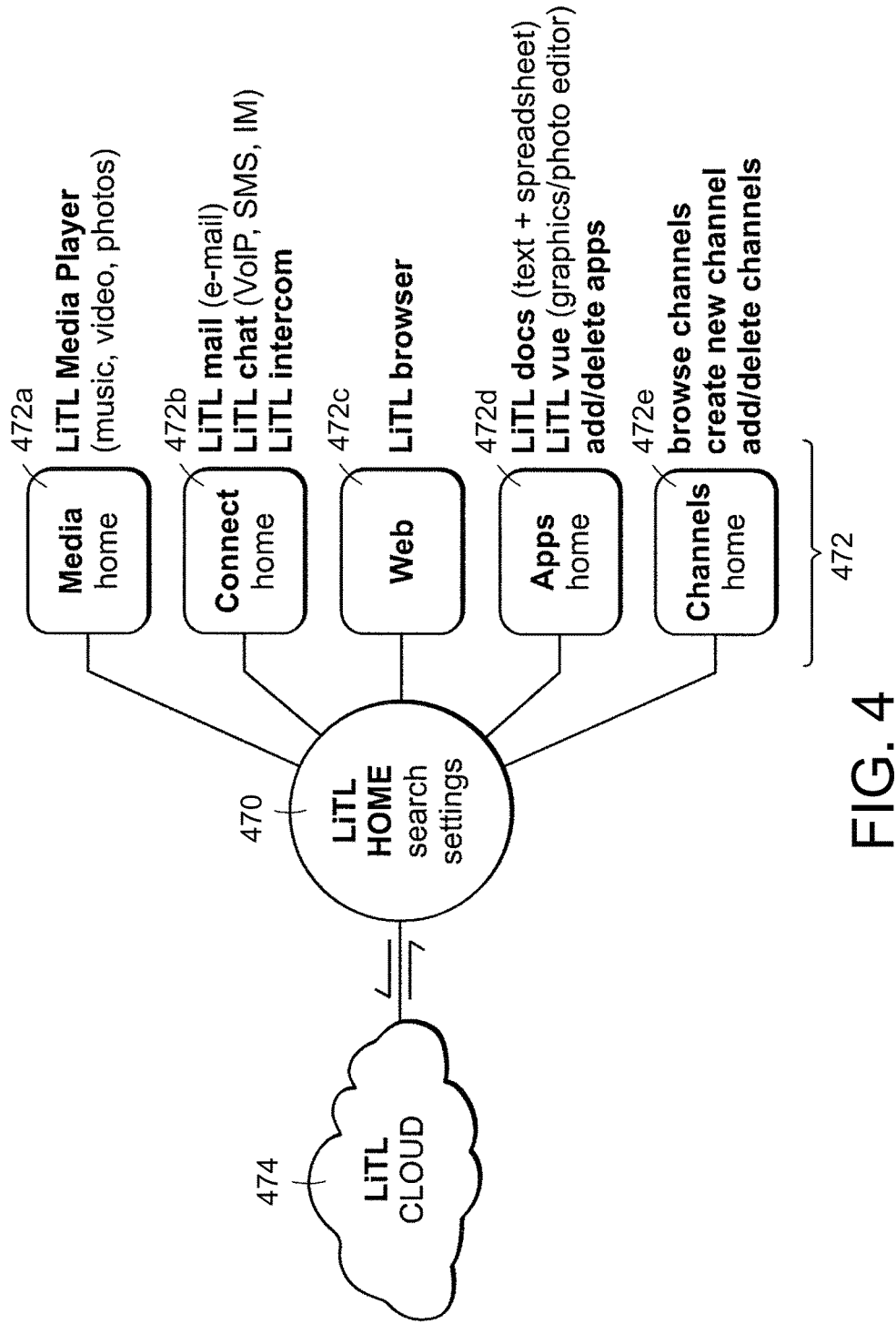
FIG. 4 is a block diagram of an architecture of the base station, including a map user interface, in accordance with aspects of at least one embodiment of the present invention.

Referring to FIG. 4, there is illustrated a block diagram of one example of an architecture of the base station 106, including a map user interface, according to at least one embodiment of the present invention. The user interface "home" screen 470 displays a plurality of modes of content 472. In the illustrated example, the home screen 470 contains five modes of content 472; however, it is to be appreciated that the home screen may include more or fewer than five modes of content and that the modes of content may differ from the examples discussed below. According to one example, the modes of content 472 accessible via the home screen 470 may include "media" 472a, "connect" 472b, "web" 472c, "applications" 472d, and "channels" 472e.

Using the map user interface, information, programs, features and applications may be grouped into the various modes of content 472. By selecting any mode of content 472, for example, by using the I/O device (e.g., remote 112), as discussed further below, the user may access the content organized within that mode. For example, the media mode 472a may provide access to a media player to play, view, search and organize media such as music, video, photos, etc.

The connect mode 472b may provide access to features such as, for example, email, voice-over-IP, instant messaging, etc., and the web mode 472c may provide access to Internet browsing and searching. The application mode 472d may provide access to, for example, computer applications or programs, such as word processor, spreadsheet, calculator, etc. In one example, these applications or programs may be provided as web-based services rather than programs or applications residing on the base station 106. The channels mode 472e may provide access to different functionality of the base station 106, with the different functions or features defined as different channels. For example, a channel may include an alarm clock channel in which the base station 106 is configured to display a clock on the television 104 and can be programmed to activate an alarm, e.g., a sound, piece of music, etc., at a predetermined time. Another example of a channel may include a "photo frame" channel in which the base station may be configured to display a pre-selected image or set of images, etc. on the television 104. Another example of a channel is a "television" channel, in which the base station 106 is configured to stream Internet television. In one example, a user may configure particular Internet television channels (e.g., a news channel, a movie channel, a home and garden channel, etc.) into sub-channels within the channels mode of content 472(e). Some or all of the modes of content 472 may access, retrieve and/or store information on the Internet. For example, in one embodiment, some or all of the modes of content 472 may access, retrieve and/or store information in a cloud network 474 via the Internet.

Figure 5:
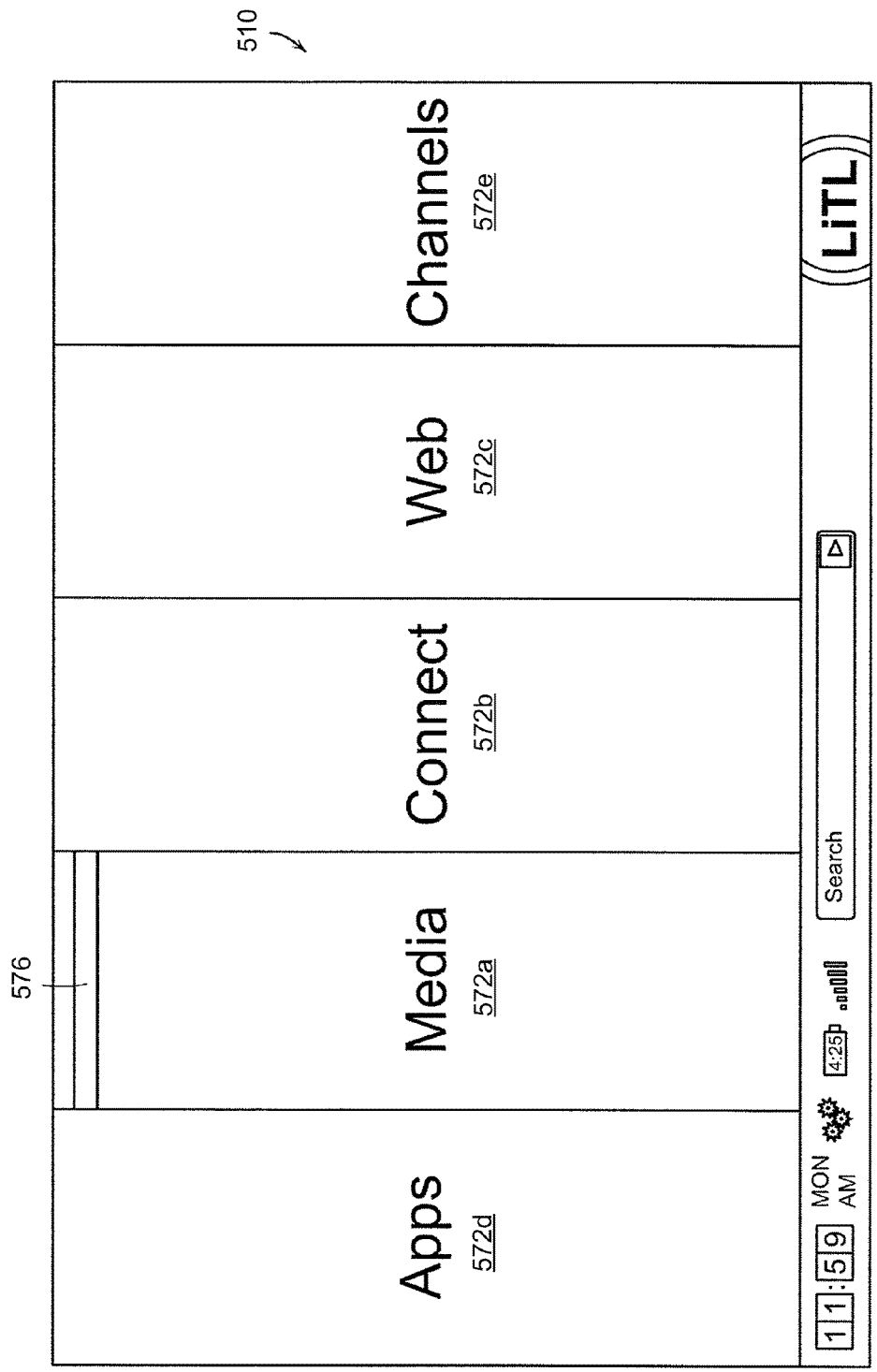
FIG. 5 is a screen shot illustrating one example of a mode of content in accordance with aspects of at least one embodiment of the present invention.
Figure 6:
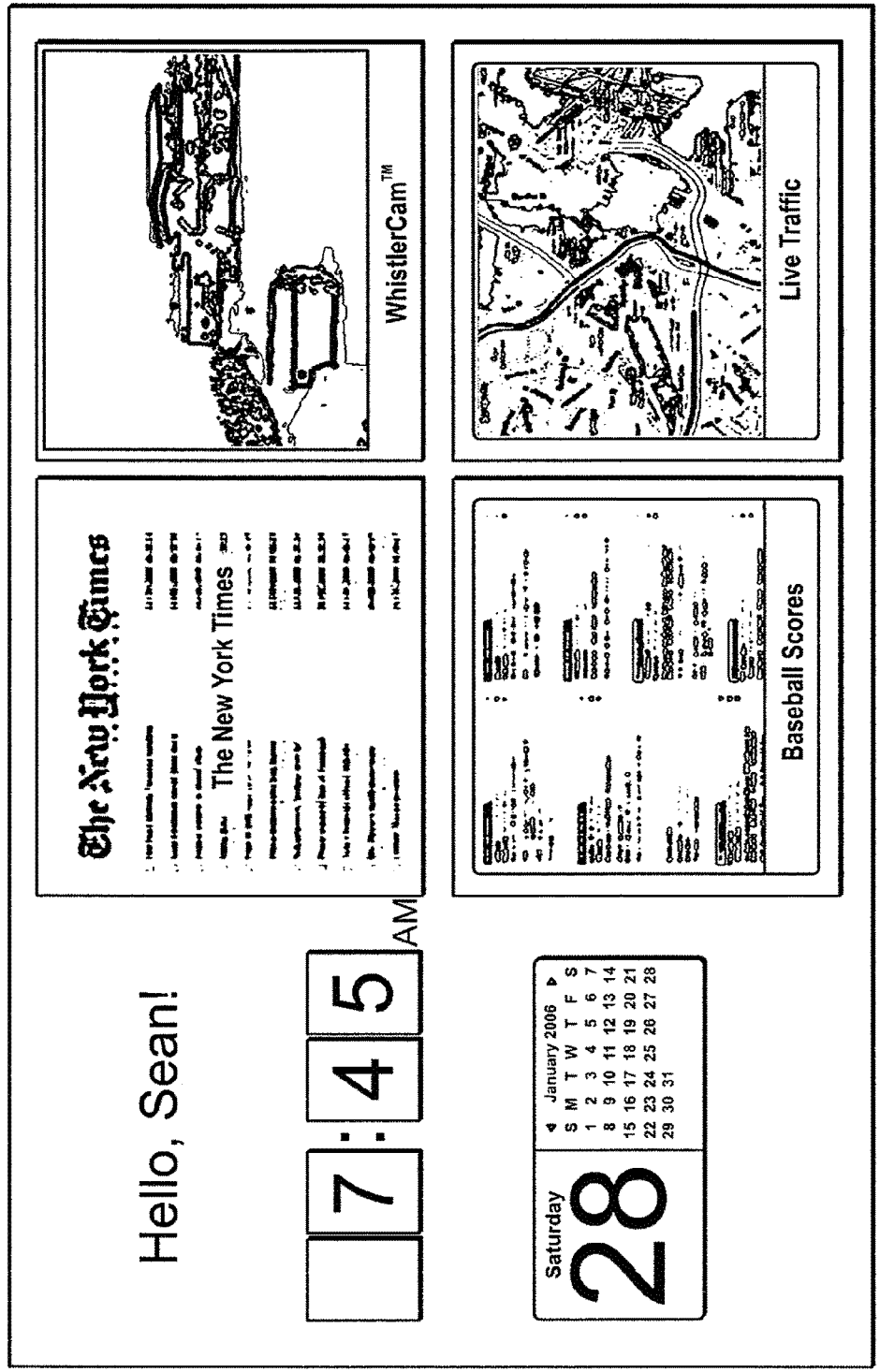
FIG. 6 is a diagram illustrating a "dashboard" type mode of content in accordance with aspects of at least one embodiment of the present invention.

According to one embodiment, the different modes of content 472 may be displayed as a series of bars across the display screen 510, as illustrated in FIG. 5. However, it is to be appreciated that the invention is not so limited, and the modes of content may be displayed in other configurations, including, for example, a "desktop" and icon configuration, a "dashboard" type display 610, as illustrated in FIG. 6, or another configuration, as would be recognized by those skilled in the art.

As discussed above, according to some embodiments, each host may include an I/O device, such as a remote control 112, which allows a user to easily and efficiently control various features and functions of the base station 106 and to manipulate content displayed on the television 104. It is to be appreciated that by providing a base station 106 coupled to a television 104 and a remote control 112 capable of sending information to the base station and operating the base station, certain aspects of the present invention reduce some of the problems discussed above with regards to the use of a computer system connected to a television. For example, by providing a wireless remote, the user is able to more easily control the base station from a distance (e.g., while the user is located on the other side of a room away from the television) without requiring the use of more typical controls (e.g., a keyboard or mouse) coupled to the base station 106 and/or located adjacent to the base station 106.

Figure 7:
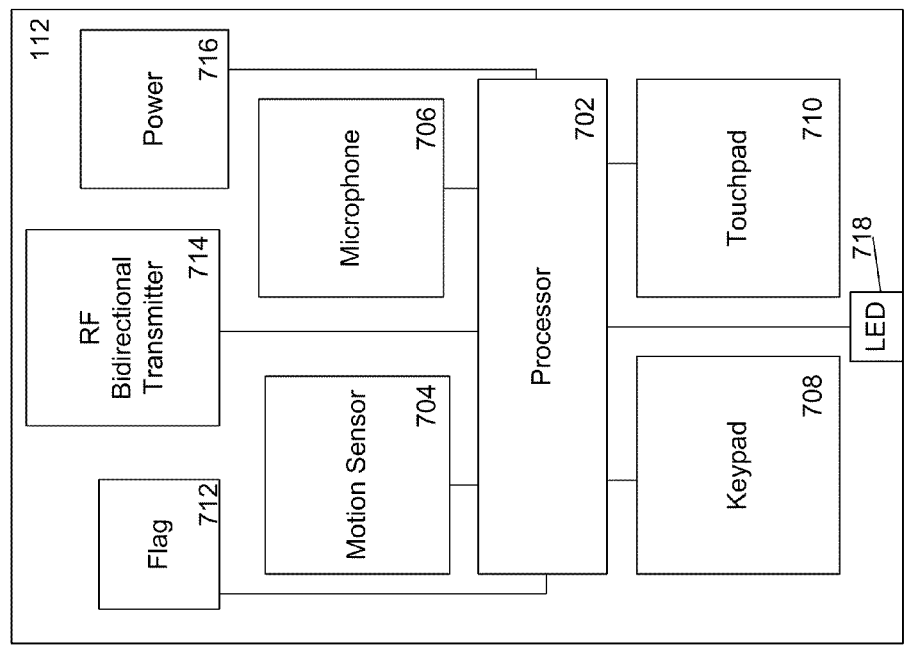
FIG. 7 is a block diagram of a remote control in accordance with aspects of at least one embodiment of the present invention.

FIG. 7 illustrates a block diagram 700 of the remote control 112 according to at least one embodiment of the present invention. The remote control 112 includes a processor 702 configured to manage the operation of the remote control 112.

Coupled to the controller are a motion sensor 704, a microphone 706, a keypad 708, a touchpad 710, a flag 712, an RF bi-directional transmitter 714, a power module 716 and a Light Emitting Diode (LED) 718. According to one embodiment, the remote control 112 also includes an antenna (not shown) coupled to the RF bi-directional transmitter 714. In one embodiment, the RF bi-directional transmitter 714 and the antenna are located with the processor 702. In one embodiment, the RF bi-directional transmitter is a half-duplex transmitter in that the transmitter can transmit and receive signals, but not at the same time.

According to one embodiment, the RF bi-directional transmitter 714 is configured (via the antenna) to transmit RF signals to, and receive signals from, an external device such as the base station 106. In one embodiment, the RF signals received and sent by the remote control 112 are Bluetooth RF signals at a frequency of 2.4 GHz; however, it is to be appreciated that the RF signals transmitted and received by the remote control 112 may be any other type of RF signal (e.g., Wi-Fi signals). According to one embodiment, the RF signals sent by the RF bi-directional transmitter 714 to the base station 106 include status information pertaining to the operation of the remote control 112. For instance, in one embodiment, the RF bi-directional transmitter 714 periodically broadcasts status bits to the base station 106 to inform the base station 106 of the status of certain operating parameters of the remote control 112. For example, according to one embodiment, RF signals (including status bits) sent by the RF bi-directional transmitter 714 may include signals representing the power remaining in the power module 716, signals representing the configuration of the remote control 112 generated by the flag 712, signals representing the firmware status of the remote control 112 and signals representing the pairing status of the remote control 112. It is to be appreciated that the remote control 112 may be configured to broadcast any number and any type of status bits.

In addition to status information, the RF signals sent by the remote control 112 may also be intended to control the operation of the base station 106. For example, RF signals sent by the RF bi-directional transmitter 714 may include audio signals generated by the microphone 706, signals representing the motion or orientation of the remote control 112 generated by the motion sensor 704, and input signals generated by either the touchpad 710 or keypad 708 in response to operation by a user.

According to one embodiment, the motion sensor 704 is any type of sensor capable of monitoring the motion or orientation of the remoter controller 112. For example, in one embodiment, the motion sensor 704 is a 3-axis accelerometer configured to detect motion of the remote control 112. In another embodiment, the motion sensor 304 is a gyroscope configured to detect the orientation of the remote control 112. According to one embodiment, the motion sensor 704 monitors the motion/orientation of the remote control and, upon sensing a change in the motion or orientation of the remote control 112, sends an interrupt signal, via the processor 702 and RF bi-directional transmitter 714 to the base station 106. The controller 204 (via the RF bi-directional transmitter 208) of the base station 106 receives the interrupt signal from the remote control 112 and sends an acknowledgment signal to the remote control 112 (via the RF bi-directional transmitter 208). Upon receiving (via the RF bi-directional transmitter 714) the acknowledgement signal from the base station 106, the remoter control 112 sends signals to the base station 106 indicating change in motion or orientation of the remote control 112. The base station 106 listens for and receives (via the RF bi-directional transmitter 208) the signals from the remote control 112 indicating the change in motion or orientation of the remote control 112. The signals indicating the change in motion or orientation of the remote control 112 are passed to the controller 204, and the controller 204 may be configured to use the motion signals in a variety of ways.

According to one embodiment, a change in motion or orientation monitored by the motion sensor 704 of the remote control 112 is used to transition the remote control 112 from a standby to a powered state. For example, when the remote control 112 has not been utilized for a pre-determined amount of time, the remote control 112 may be configured to enter a standby mode to save power. In the standby mode, power to certain components of the remote control 112 may be limited. However, it is to be appreciated, that as a result of the general low power requirements of the motion sensor 704, power may still be provided to the motion sensor 704, and the motion sensor 704 may continue to monitor the motion and/or orientation of the remote control 112, even in standby mode. While in standby mode, upon sensing a change in motion or orientation of the remote control 112 (e.g., a user shaking the remote control 112), the motion sensor 704 may communicate with the processor 702 to power up (wake-up) the remote control 112. Additionally, it is to be appreciated that the remote control 112 may be configured to respond in any number of ways to a change in motion or orientation sensed by the motion sensor 704.

According to another embodiment, motion signals received by the base station 106 from the motion sensor 704 may be used to interact with the user interface provided by the base station 106 to the television 104. For example, in one embodiment, a specific motion of the remote control 112, sensed by the motion sensor 704, may correlate to specific action in a game being played on the base station 106 by a user. For instance, a turn of the remote control 112 right, sensed by the motion sensor 704 and communicated to the base station 106, may correlate to a figure in the game moving right. Similarly, a turn of the remote control 112 left, sensed by the motion sensor 704 and communicated to the base station 106, may correlate to a figure in the game moving left.

In another embodiment, a specific motion of the remote control 112, sensed by the motion sensor 704, may correlate to a specific behavior of a curser in the user interface displayed on the television 104 by the base station 106. For example, a turn of the remote control 112 right, sensed by the motion sensor 704 and communicated to the base station 106, may correlate to the cursor moving to the right. Similarly, a turn of the remote control 112 left, sensed by the motion sensor 704 and communicated to the base station 106, may correlate to the cursor moving left. Also, in another embodiment, a specific motion of the remote control 112 may indicate to the base station 106 that the user is making a selection with the cursor. For example, a vigorous shake of the remote control 112 may indicate to the base station 106 that the user is selecting whatever the cursor is currently pointed at.

In another embodiment, the remote control 112 may be able to sense different degrees of changing movement or orientation of the remote control 112 and the base station 106 may be configured to perform different actions in response to the different degrees. For example, in one embodiment, when the remote control 112 is turned to the right at a first degree, the cursor displayed on the television 104, by the base station 106, may move to the right at a first speed. When the remote control 112 is turned to the right at a second degree, which is greater than the first degree, the cursor displayed on the television 104, by the base station 106, may move to the right at a second speed, greater than the first speed. It is to be appreciated that the base station 106 may be configured to respond in any number of ways to the motion signals communicated from the motion sensor 704 of the remote control 112 to the base station 106.

According to one embodiment, the microphone 706 may be any type of circuit capable of receiving audio signals from a user and transmitting the audio signals to the base station 106 via the processor 702 and the RF bi-directional transmitter 714. According to one embodiment, the microphone 706 may be configured to communicate with the base station 106 using a selective repeat ARQ (Automatic Repeat-reQuest) protocol; however, it is to be appreciated that the microphone may be configured to communicate to the base station 106 over any protocol. According to another embodiment, the audio signals transmitted by the microphone to the base station 106 may be encoded by a CODEC into 8 bit packets and transmitted at 24 kHz; however, it is to be appreciated that the audio signals may be encoded and transmitted differently.

Utilizing the selective repeat ARQ protocol, the microphone 706 receives audio signals from a user. The audio signals are encoded into audio signal packets and each audio signal packet is labeled with a sequence number. According to one embodiment, upon receiving audio signals, the microphone 706, via the processor 702 and RF bi-directional transmitter 714 sends an interrupt signal to the base station 106. The controller 204 (via the RF bi-directional transmitter 208) receives the interrupt signal and the controller sends (via the RF bi-directional transmitter 208) an acknowledgment signal back to the remote control 112. Upon receiving (via the RF bi-directional transmitter 714) the acknowledgement signal from the base station 106, the remoter control 112 sends encoded audio signals to the base station 106. The base station 106 listens for and receives (via the RF bi-directional transmitter 208) the encoded audio signals from the remote control 112. Because each audio signal packet is sequentially numbered, the base station 106 is able to determine if any audio signal packets have been dropped. The base station 106 sends (via the RF bi-directional transmitter 208) additional acknowledgment signals to the remote control 112. Included in the additional acknowledgment signals are indications of what packets were dropped and need to be resent. The processor 702 (via the RF bi-directional transmitter 714) receives the acknowledgment signals and resends the previously dropped packets along with current audio signal packets to the base station 106. According to one embodiment, the internal clocks of the remote control 112 and the base station 106 may be synchronized (e.g., to 24 kHz) so minimize the loss of data between the remote control 112 and the base station 106.

Upon receiving the audio signal packets, the base station 106 may perform a variety of tasks with the received audio signals. According to one embodiment, the audio signals received by the base station 106 may be used in a video-chat session in correlation with the camera 212. In another embodiment, the audio signals received by the base station 106 may be used in a teleconference session. According to another embodiment, the audio signals received by the base station 106 may be used to interact with the user interface displayed on the television 104 by the base station 106. For example, when a user says a specific command, the corresponding audio signals transmitted to the base station 106, may result in a specific action being taken in the user interface. For instance, if a user says a command "Select" or "Go" while the cursor of the user interface is pointing at a specific area, the resulting signals sent to the base station 106 by the remote control 112 will result in the user interface selecting the specific area being pointed to by the cursor. In another example, the user interface will generate text in a text field (e.g. a search box) based on words spoken by a user. It is to be appreciated that the base station 106 may be configured to respond in any number of ways to the audio signals communicated from the microphone 706 of the remote control 112 to the base station 106.

According to another embodiment, a specific sound or even any sound at all, received by the remote control 112 and transmitted to the base station 106 may be used to transition the remote control 112 from a standby to a powered state. For example, when the remote control 112 has not been utilized for a pre-determined amount of time, the remote control 112 may be configured to enter a standby mode to save power. In the standby mode, power to certain components of the remote control 112 may be limited. However, power may still be provided to the microphone 706, and the microphone 706 may continue to monitor for audio signals from the user, even in standby mode. While in standby mode, upon sensing a specific predetermined sound, or even any sound at all, made by the user, the microphone 706 may communicate with the processor 702 to power up (wake-up) the remote control. Additionally, it is to be appreciated that the remote control 112 may be configured to respond in any number of ways to different sounds sensed by the microphone 706.

It is to be appreciated that by providing the microphone 706 within the remote control 112 and transmitting audio signals from the remote control 112 to the base station 106, the present invention reduces some of the problems discussed above with regards to the use of the computer system connected to a television. For example, because the microphone 706 is actually located within the remote control 112 and not at the computer system itself, a user operating the base station 106 from a distance with the remote control 112 can have the microphone immediately accessible to him and does not need to address issues relating to the microphone receiving audio signals from a distance.

According to one embodiment, the power module 716 includes at least one battery (not shown). According to one embodiment, the battery is rechargeable. In one embodiment a signal from the power module is sent to the processor 702 indicating the amount of available power stored on the battery. According to one embodiment, in order to save power, the processor 702 sends signals to certain unused components of the remote control 112 to power down the unused components. For example, if the microphone 706 is not being used, the processor 702 may power down the microphone 706. Upon receiving an indication that operation of the microphone 706 is desired (e.g., a signal from the base station 106 indicating that an application using the microphone, such as a video-chat session, has been initialized), the processor 702 sends a signal to the microphone 706 to power up the microphone.

According to another embodiment, if the processor 702 determines that the remote control 112 has gone unused for a predetermined amount of time, the processor 702 may send signals to the components of the remote control 112 to power down the remote control 112 into a standby mode and reduce power consumption. In one embodiment, even in the standby mode, certain components may remain powered. In this way, a user may utilize one of the remaining powered components to power up or wake-up the remote control 112. For example, in one embodiment, the touchpad 710 and/or keypad 708 may remain powered in standby mode. If a user presses either the touchpad 710 or keypad 708, the remote control 112 will be powered up. In another example, the microphone 706 remains powered in standby mode. If a user says a certain word (e.g., "Power On), the remote control 112 will be powered up. In another example, the motion sensor 704 may remain powered in standby mode. If a user moves the remote control 112 in a certain way (e.g., a slight shake), the remote control 112 will be powered up.

According to another embodiment, the processor 702 receives signals from the power module 716 indicating the amount of available power remaining on the battery. In response to the signals from the power module 716, the processor may transmit (via the RF bi-directional transmitter 714) remaining power information to the base station 106. According to one embodiment, the remaining power information received by the base station 106 is in the form of at least one power status bit. In one embodiment, the at least one power status bit is transmitted periodically, or upon request, by the remote control 112 to the base station 106. According to one embodiment, the at least one status bit indicates whether the power available in the power module 716 is above (e.g., status bit=0) or below (e.g., status bit=1) a threshold level. According to another embodiment, the at least one power status bit indicates whether the remote control 112 is in a powered (e.g., status bit=0) or standby (e.g., status bit=1) state.

According to one embodiment, once the base station 106 receives the at least one power module status bit, the controller 204 sends an acknowledgment signal to the remote control 112 and the controller 204 is able to determine whether the remote control 112 is capable of performing certain functions. For example, if the power status bit, received the controller 204 (via the RF bi-direction transmitter 208) indicates that the power available in the power module 716 is below a required threshold, the controller 204 knows not to attempt to activate certain functions of the remote control 112 (e.g., firmware updates as discussed in greater detail below). However, if the power status bit indicates that the power available in the power module 716 is above the required threshold, the controller 204 is free to activate all functions of the remote control 112.

It is to be appreciated that in providing advanced power management of the power module 716 of the remote control 112, the present invention provides a remote control 112 that is generally reliable and can be used consistently to operate the base station 106, without requiring the frequent replacement or recharging or batteries and/or a fixed hardwired power line to the remote control 112 which would hinder the motion/use of the remote control 112 by the user.

According to one embodiment, the LED 718 may be any type light emitting circuitry. In one embodiment, the LED is operated by the processor 702. According to one embodiment, the LED 718 is configured to show a solid light when the remote control 112 is powered on. According to another embodiment, the LED 718 is configured to flash when the remote control 112 is either successfully sending to or receiving information from the base station 106. For example, in one embodiment, the LED 718 flashes when an acknowledgment signal is successfully received from the base station 106. According to another embodiment, the LED 718 is able to flash more than one color. For example, in one embodiment, the LED 718 will flash green when then the remote control 112 is in a powered up state and will flash purple when the remote control 112 is in a standby state. It is to be appreciated that the LED 718 may be configured in any way to represent any number of different events In another embodiment, the remote control 112 may include a second LED (not shown). In such an embodiment, the first LED 718 and the second LED may be configured to signal different events. For example, in one embodiment, the first LED 718 is configured to flash when a signal is sent to the base station 106 and the second LED is configured to flash when a signal is successfully received from the base station 106. It is to be appreciated that the remote 112 may include any number of LEDs that are configured to identify any number of events.

According to one embodiment, the keypad 708 comprises a plurality of keys (not shown) configured in a plurality of rows and columns. In one embodiment, the plurality of keys includes keys associated with text letters and numbers. In another embodiment, the plurality of keys includes keys associated with functions of the base station 106. In another embodiment, the plurality of keys includes keys associated with the user interface displayed on the television 104 by the base station 106. Also, according to one embodiment, the keypad 708 may also include pairs of keys that when pressed individually perform one function, but when pressed together, perform an entirely different function.

According to one embodiment, each key of the keypad 708 is coupled to an Inter-Integrated Circuit (I2C) (not shown). In one embodiment, in order to reduce the amount of wires from the keys to the processor 702, the I2C is coupled to an I/O expander (not shown) which is coupled to the processor 702. In one embodiment, the I2C is responsible for scanning the rows and columns of keys of the keypad 708 to monitor whether any of the keys have been pressed. In response to a user pressing one of the keys, the I2C sends a signal to the processor 702, through the I/O expander. The signal received by the processor 702 indicates which key has been pressed. The processor sends a signal to the base station, via the RF bi-directional transmitter 714, indicating which key has been pressed. The controller 204 of the base station 106 receives the signal, via the RF bi-directional transmitter 208 and sends an acknowledgment signal, via the RF bi-directional transmitter 208 to the processor 702 of the remote control 112. Upon receiving the signal indicating the pressed key, the controller 204 may perform a variety of tasks.

In one embodiment, in response to a user pressing a key associated with a text letter or number, the controller 204 may enter the text into the user interface being displayed on the television. For example, if the user is using the user interface as a word processor, the controller 204 will enter the text associated with the pressed key into the word processor document currently displayed. In another example, if the user is using the user interface as a search engine, the base station 106 will enter the text associated with the pressed key into the search box currently displayed.

In another embodiment, in response to a user pressing a key associated with a function of the controller 204, the controller 204 may initiate the function associated with the pressed key. For example, if a user presses a key associated with a specific application, the controller 204 will open the specific application associated with the pressed key.

According to another embodiment, in response to a user pressing a key associated with an operation of the user interface, the controller 204 may initiate the operation associated with the pressed key. For example, if a user presses a "Back" key while using the user interface as a web browser, the controller 204 will display the previously displayed web page. In another example, if a user presses a search key while using the user interface as a web browser, the controller 204 will open a search box. It is to be appreciated that the keypad 708 may include any number and type of keys and the keys may be defined to perform any number of functions.

According to one embodiment, the touchpad 710 includes a capacitive or conductive flat surface that is capable of translating the motion and position of a user's fingers to signals useable by the user interface of the base station 106. The signals are passed to the processor 702 and the processor transmits the touchpad signals to the base station 106 via the RF bi-directional transmitter 714. The controller 204 of the base station 106 receives the touchpad signals via the RF bi-directional transmitter 208 and sends an acknowledgement signal via the RF bi-directional transmitter 208 to the remote control 112. Once the controller 204 has received the touchpad signals, the controller 204 configures the user interface of the base station 106 based on the touchpad signals.

According to one embodiment, the touchpad also includes a depressible switch located beneath the flat surface. The depressible switch is located in such a position that when a user presses on the flat surface of the touchpad, the depressible switch is activated. When a user presses the depressible switch, a switch signal is passed to the processor 702 and the processor transmits the switch signal to the base station 106 via the RF bi-directional transmitter 714. The controller 204 of the base station 106 receives the switch signal via the RF bi-directional transmitter 208 and sends an acknowledgement signal via the RF bi-directional transmitter 208 to the remote control 112. Once the controller 204 has received the switch signal, the controller 204 configures the user interface of the base station 106 based on the switch signal.

According to one embodiment, the touchpad 710 of the remote control 112 may allow a user to control, adjust and/or select various functionality of the base station 106. According to another embodiment, the touchpad 710 may be used to provide "hardware navigation" through information, such as menus, icons, etc., of the user interface displayed on the television 104. For example, according one embodiment, when a user swipes a finger across the touchpad 710 (e.g., from one point to another), the touchpad may sequentially highlight different ones of the modes of content 472. In one example, the highlighting may be achieved by changing the color of the selected mode, and/or by providing a visual indicator, such as a colored bar 576. A highlighted mode 472 may be selected by pressing the touchpad 710, thereby bringing up a new "page" or screen on the user interface corresponding to the selected mode. Once within a selected mode of content 472, the touchpad 710 may similarly be used to select particular functions, features, icons or applications within that mode.

According to one embodiment, the touchpad 710 is capable of being operated by two fingers (e.g., two finger navigation) of a user. According to another embodiment, the touchpad 710 is configured to operate with double down or double up navigation. In one embodiment, double down or double up navigation means that if a user swipes the touchpad in a certain direction and then continues to press in the same direction, or makes another movement in the same direction, the touchpad may automatically begin to scroll in the swiped direction.

According to one embodiment, before the remote control 112 is able to communicate with the base station 106, it must be paired with the base station 106. According to one embodiment, a powered remote control 112 that is currently unpaired with a base station 112 transmits, via the RF bi-directional transmitter 714, periodic pairing requests on a predefined control channel. The pairing requests may include information about the remote control 112, such as address information and/or status bits indicating that the remote control would like to be paired with a base station 106. A base station 112 within the transmission range of the remote control 112 receives the pairing request from the remote control 112, via the RF bi-directional transmitter 208. In response to receiving the pairing request, the controller 204 of the base station transmits a signal back to the remote control 112, via the RF bi-directional transmitter 208, requesting that the remote control 112 reduce the power level of its transmitted pairing signal. For example, according to one embodiment, the controller 204 requests that the remote control reduce the power of its pairing signal by 18 dB; however, it is to be appreciated that the power reduction request may be defined differently.

In response to receiving the request to reduce power, via the RF bi-directional transmitter 714, the processor 702 of the remote control reduces the power of the pairing signals. If the base station 106 no longer is able to receive the pairing signals from the remote control 112, the base station 106 determines that the remote control 112 is out of its range and it may continue to listen for pairing signals from other remote controls 112. According to one embodiment, if a pairing process has failed, the base station 106 may display a message on the television 104 indicating as such.

If, after the remote control 112 reduces power, the base station 106 is still able to receive the pairing signals from the remote control 112, the base station 106 determines that the remote control 112 is close enough to pair with and the remote control 112 and base station 106 may exchange additional information regarding how the two will communicate in the future. Once a remote control 112 and base station 112 are paired, the base station 112 may display a message on the television 104 indicating as such.

According to one embodiment, once the power of the pairing signals is reduced (per request of the base station 106), the signal strength of the pairing signals may be so low that it requires the remote control 112 to actually be placed adjacent to (e.g., within 6 inches), or even on top of, the base station 106, for the base station 106 to receive the pairing signals. This may insure that the remote control 112 is within range of the base station 106.

According to another embodiment, once a remote control 112 and a base station have been paired once before, future pairings may occur more easily. For example, if a base station 106 recognizes a remote control 112 that it has previously been paired with, the base station 106 may immediately provide the remote control 112 with information on how to communicate with the base station 106. Such an embodiment would ensure that remote controls 112 often used with a particular base station 106 (e.g., in someone's home), would not need to go through the whole pairing process every time a user wanted to use the base station 106.

According to another embodiment, multiple remote controls 112 may be paired with a base station 106 at any given time. For example, this may be beneficial when multiple users are utilizing the base station 106 to play a game. In such an embodiment, the base station 106 is able to associate received signals with corresponding remote controls 112. Additionally, in one embodiment, when more than one remote control 112 is paired with the base station, the last remote control 112 to send a successful signal to the base station 106 is the remote configured to currently control the base station 106.

According to one embodiment, the remote control 112 is able to receive over the air firmware updates from the base station 106. In one embodiment, the base station 106 is configured to periodically receive software updates over the Internet. Included within the software updates may be updated firmware for the remote control 112. According to one embodiment, the remote control 112 is configured to periodically, or on demand, transmit firmware status bits to the base station 106. In one embodiment, the firmware status bits indicate whether the firmware of the remote control 112 should be updated.

Upon receiving updated firmware for the remote control 112 and confirming (via the firmware status bits) that the remote control 112 requires a firmware update, the base station 106 may display a message to the user, via the television, asking the user whether he would like to update the firmware of the remote control 112. If the user indicates that he would like to update the firmware, the remote control enters a boot loader mode. According to one embodiment, prior to entering boot loader mode, the base station 106 may also check the power status bits received from the remote control 112 (discussed earlier), to confirm that the remote control has enough power in the power module 716 to complete the firmware update.

According to one embodiment, once in boot loader mode, a remote control 112 begins to transmit a boot loader mode status bit which indicates that the remote control 112 is in boot loader mode. Upon entering boot loader mode, the base station 106 transmits the firmware update to the remote control 112. If the update is transmitted in whole, and the remote control 112 determines that there were not any issues with the updating, the remote control 112 exits boot loader mode, operates and boots the remote control 112 from the updated firmware and updates the corresponding status bit accordingly. Upon seeing the change in boot loader mode status bit, indicating a successful firmware update, the base station 106 displays a message to the user, indicating as such.

According to another embodiment, if the firmware update is interrupted (e.g., because the base station 106 is turned off, because the remote control 112 loses power, because the connection between the remote control 112 and the base station 106 is lost, or for any other reason) the remote control 112 will remain in boot loader mode. In one embodiment, while operating in boot loader mode, the remote control 112 boots and operates from protected memory. In this way, even if the firmware update process is interrupted (and therefore the firmware is incomplete or corrupted), use of the remote control 112 may still remain possible through the use of the protected memory.

According to one embodiment, after an incomplete firmware update, the remote control 112 will remain in boot loader mode and the boot load status bit indicates as such. In this way, any base station 106 (not only the base station 106 by which the firmware update was started) that the remote control 112 is paired with, may receive the boot loader mode status bit, sense that the remote control 112 is still in boot loader mode, and attempt to finalize the firmware update. For example, if a user attempts to update the firmware of his remote control 112 at home, but the update fails for one reason or another, the user may bring his remote control 112 to another base station 112, pair the remote with the base station (via the process discussed above) and continue the firmware update process.

According to one embodiment, the remote control 112 is able to be operated in multiple configurations. In one embodiment, the flag 712 transmits signals indicative of which configuration the remote control 112 is in. For example, in one embodiment, the flag 712 is a mechanical flag that is able to be physically configured in at least two positions. The flag 712 may be configured to generate status bits depending on its position. For example, according to one embodiment, the flag 712 sends a first status bit (e.g., status bit=0) if the flag 712 is in a first position and the flag 712 sends a second status bit (e.g., status bit=1) if the flag 712 is in a second position. In one embodiment, the remote control 112 transmits (via the RF bi-directional transmitter 714) periodically, or as requested, the flag status bit to the base station 106. The controller 204 of the base station 106 receives the flag status bit (via the RF bi-directional transmitter), sends an acknowledgment signal to the remote control 112 and configures the user interface of the base station based on the status of the flag 712.

Figure 8:
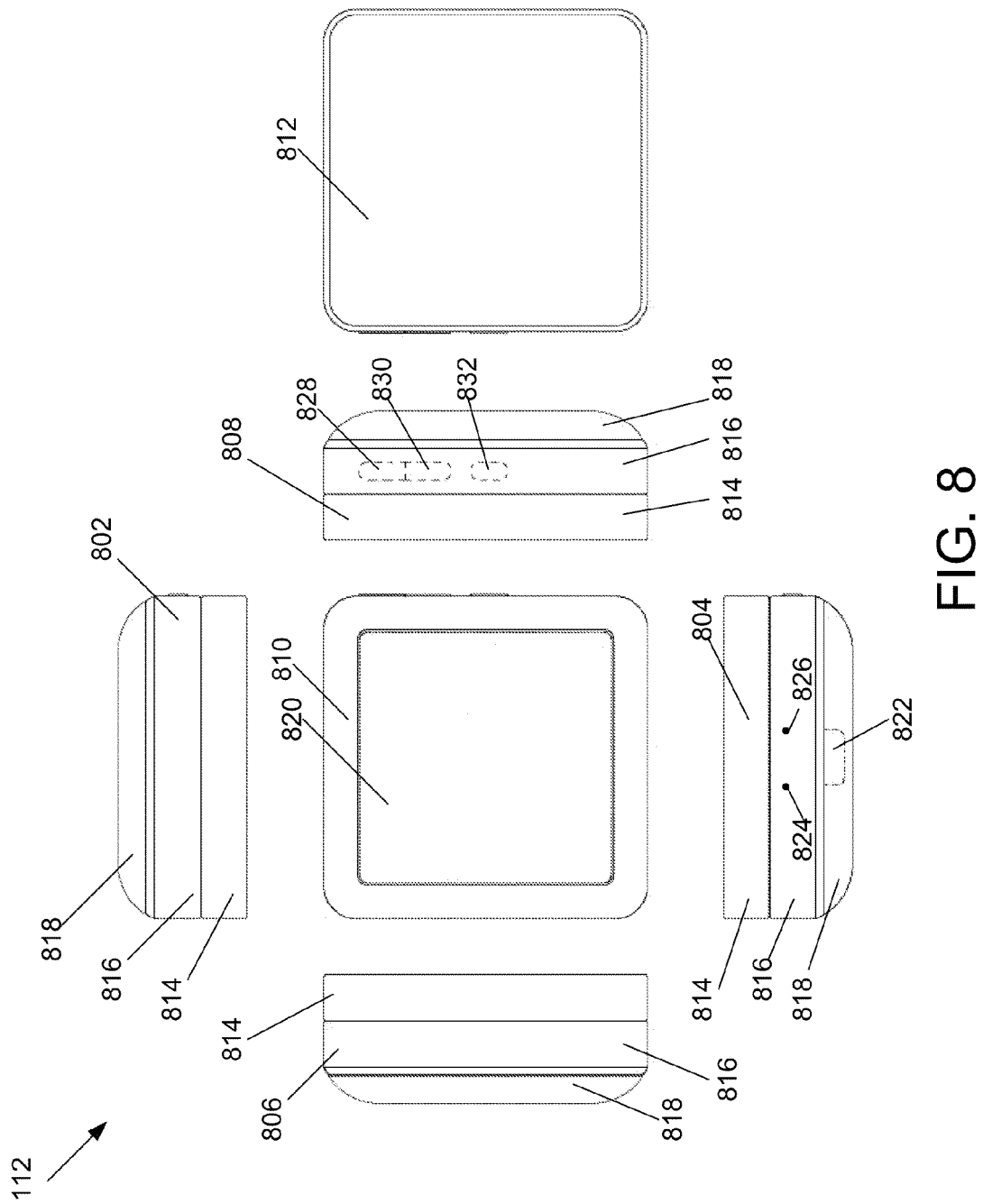
FIG. 8 is an external schematic diagram of a remote control in "passive mode" in accordance with aspects of at least one embodiment of the present invention.
Figure 9:
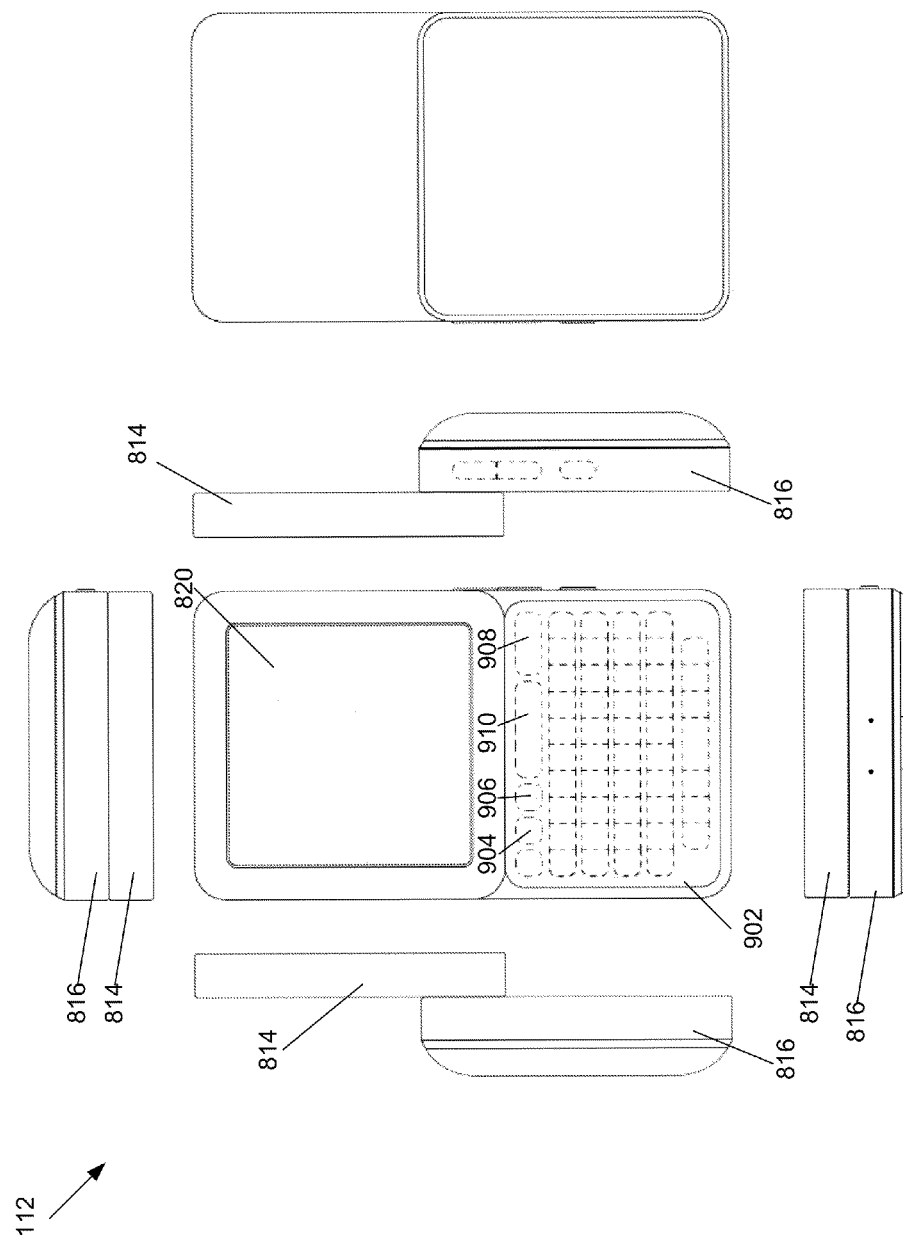
FIG. 9 is an external schematic diagram of a remote control in "active" mode in accordance with aspects of at least one embodiment of the present invention.

Illustrated in FIGS. 8-9 is a remote control 112 capable of operating in dual modes according to one embodiment of the present invention. For example, FIG. 8 illustrates an external schematic diagram of the remote control 112 according to one embodiment of the present invention. FIG. 8 illustrates a top side 802, a bottom side 804, a left side 806, a right side 808, a front side 810 and a back side 812 of the remote control 112. The remote control 112 includes a housing comprised of a first portion 814 and a second portion 816. The remote control 112 also includes a battery compartment 818 configured to be detachably coupled to the second portion 816 of the housing. The battery compartment 818 may include a power module 716 as discussed above. In one embodiment, the battery compartment 818 also includes a switch 822 configured to release the battery compartment from the second portion 816 when pressed.

The front side 810 of the remote control includes a touchpad 820 configured to operate as the touchpad 710 discussed above. The bottom side 804 may also include an LED indicator 824 configured to operate as the LED 718 discussed above. The bottom side 804 may also include a microphone hole 826. The microphone hole 826 may be configured to provide external access to the microphone 706 (as discussed above), allowing the microphone 706 to receive audio signals from a user. The right side 808 of the remote control 112 may include a set of volume control buttons. For example, the volume control buttons may include a volume up button 828, a volume down button 830, and/or a volume mute button 832 configured to control the volume of audio signals output by the base station 106.

According to one embodiment, the first portion 814 of the remote control 112 is slideably connected to the second portion 816 and is able to be moved to two different positions relative to the second portion 816, configuring the remote control 112 in two different ways. For example, in a first remote control 112 configuration as illustrated in FIG. 8, the first portion 814 of the remote control 112 is slid into a first position directly over the second portion 816, covering up a keypad (not shown). It is to be appreciated that when the first portion is slid into a first position, only the touchpad 820 is accessible by a user and a keypad (not shown) is not accessible by a user.

Once the first portion 814 is slid into the first position, a flag (e.g., flag 712) senses the first position of the first portion 814 and transmits a corresponding signal to the base station 106 (as described above), indicated that the remote control 112 is in a first configuration. According to one embodiment, once the base station 106 receives a signal that the remote control 112 is in a first configuration, the remote control 112 and the base station 106 enter a passive (or closed) mode.

According to one embodiment, in the passive mode, the remote control 112 is intended to be used by a user to interact with the base station 106 on a limited basis. For example, when in passive mode, a user may only desire to view content displayed on the television 104, and may not desire to actually interact with the content. For instance, a user who wishes to view online video content on the television 104 may only need to select the content and then proceed to view the content. In such a situation, the users required interaction with the baste station 106 would be limited to the act of selecting the content. As such, in the passive mode, the remote control 112 is configured so that only the touchpad 820 is accessible by a user.

In the passive mode, a user may operate the touchpad 820 (as discussed above with relation to touchpad 710) to scroll through information of the user interface (e.g., menus, icons, applications etc.) When a desired item of information is highlighted, the user may depress the touchpad 820 (as discussed above) to select the desired content. For example, by swiping a finger across the touchpad 820, a user may scroll through applications displayed on the user interface until a desired Internet television channel is highlighted. Upon pressing down on the touchpad 820, the Internet television channel is selected and opened and the user may view the content provided by the channel.

According to one embodiment, in the passive mode, the user interface displayed by the base station 106 on the television 104 may also change in response to an indication that the remote control 112 is in passive mode. For example, in one embodiment, in response to the remote control 112 being in passive mode, the user interface may enter a streamlined mode of content. According to one embodiment, in a streamlined mode of content, only pre-determined default information, not requiring the use of any controls other than the touchpad 820, may be displayed. For example, in one embodiment, upon the remote control 112 entering passive mode, the user interface may be configured to only display scrollable and selectable information and may eliminate text based or cursor based information (e.g., URL boxes, search boxes etc, text boxes etc.). For instance, in one example, upon the remote control 112 entering passive mode, the user interface may be configured to only display available TV Internet channels. By swiping a finger across the touchpad 820, a user may be able to automatically scroll through the available channels (absent a cursor) and select a desired channel by depressing the touchpad 820. Additionally, it is to be appreciated that the user interface may be configured in any way to make interaction with the user interface in passive mode more simple and efficient.

According to one embodiment, while the remote 112 is in passive mode, certain components, such as the microphone 706, the motion sensor 704, the RF bi-directional transmitter 714, the power module 716 and the LED 718 will remain powered and operate as discussed above with relation to FIG. 7.

According to one embodiment, in a second remote control 112 configuration as illustrated in FIG. 9, the first portion 814 of the remote control 112 is slid into a second position offset from the second portion 816, revealing a keypad 902. It is to be appreciated that when the first portion is slid into a second position, both the touchpad 820 and the keypad 902 are accessible by a user.

Once the first portion 814 is slid into the second position, a flag (e.g., flag 712) senses the second position of the first portion 814 and transmits a corresponding signal to the base station 106 (as described above), indicated that the remote control 112 is in a second configuration. According to one embodiment, once the base station 106 receives a signal that the remote control 112 is in a second configuration, the remote control 112 and the base station 106 enter an active (or open) mode.

According to one embodiment, in the active mode, the remote control 112 is intended to be used to interact fully with the user interface of the base station 106 in a full mode of content. For example, in the active mode, a user may operate the touchpad 820 (as discussed above) to scroll through information of the user interface (e.g., menus, icons, applications etc.) and may also use the touchpad 820 to move a cursor. When a desired item of information is highlighted, the user may depress the touchpad 820 (as discussed above) to select the desired content. In addition, a user may also operate the keypad 902 (as discussed above in relation to keypad 708) to interact with the user interface.

For example, a user may utilize the touchpad 820 to move a cursor over specific information, or scroll through information, displayed by the user interface. The user may select the desired information by depressing the touchpad 820 and then interact with the information by using the keypad 902. In one instance, a user wishing to browse the web may use the touchpad 820 to move a cursor over an icon representing a web browser. The user may select the icon by depressing the touchpad 820, upon which a URL text box is displayed by the user interface. Using the keypad 902, the user may enter the desired destination URL and submit the URL by again depressing the touchpad 820.

According to one embodiment, the keypad 902 may include a plurality of dedicated web buttons, located at the top of the keypad 902, and configured to mimic the operation of a typical web browser header. For example, in one embodiment, the keypad 902 includes a back dedicated web button 904, a forward dedicated web button 906, a search dedicated web button 908 and a URL dedicated web button 910. However, it is to be appreciated that the keypad 902 may include any number and type of dedicated web buttons and the dedicated web buttons may be configured in any variety of ways.

According to one embodiment, while a user is utilizing the user interface of the base station 106 to browse the web, the forward 906 and back 904 dedicated web buttons are configured to navigate forward and backward through the history of the current web session respectively. According to another embodiment, the search 908 and URL 910 dedicated web buttons provide a way for a user to enter a search or a URL, respectively, with the push of a single button. As discussed below, the search 908 and URL 910 dedicated web buttons may perform different functions depending on the information that is already, or has been, displayed in the user interface.

Figure 14:
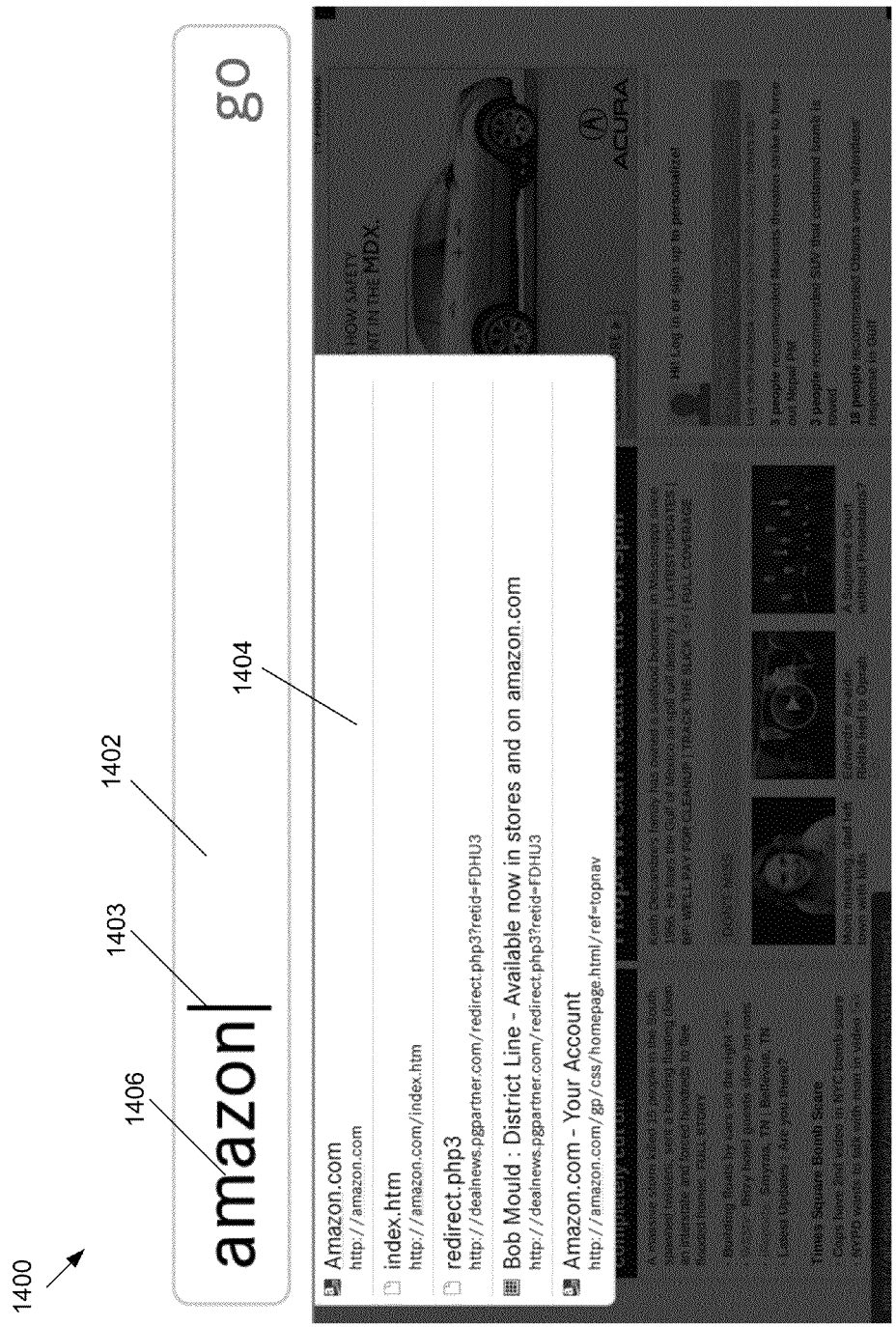
FIG. 14 is a diagram illustrating a user interface illustrating a URL box in accordance with aspects of at least one embodiment of the present invention.

For example, as illustrated in FIG. 14 and according to one embodiment, if the user interface 1400 is already displaying a web browser, a press of the URL button 910 will result in a URL box 1402 being revealed. According to one embodiment, when the base station 106 is coupled to a television 104, the URL box 1402 may be enlarged so that it is relatively easy for a user, operating the base station 106 from a distance, to see characters that have just been typed and so that it is relatively easy for a user to detect any typographical errors. The cursor 1403 of the user interface 1400 will focus on the URL box 1402 (in preparation for input by the user via the keypad 902) and the URL of the page currently being viewed will be selected. In one embodiment, upon a user entering text 1406 into a URL box 1402, the URL box 1402 may provide selectable suggestions 1404 (e.g., auto-complete suggestions from previously entered URLs) on what URL the user is intending to input. A user may scroll through the suggestions using the touchpad 820 and select a suggestion by depressing the touchpad 820.

Figure 15:
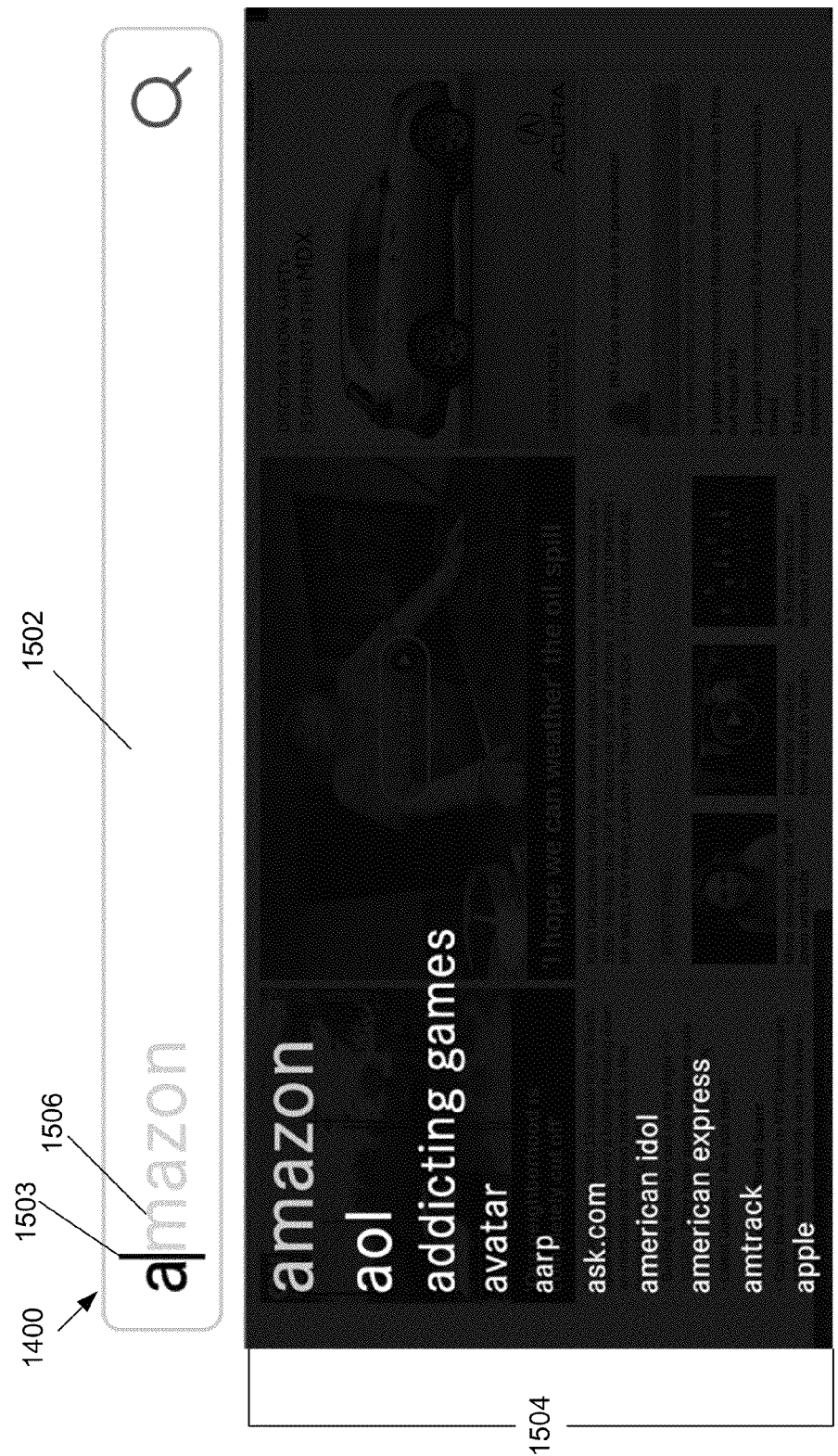
FIG. 15 is a diagram illustrating a user interface illustrating a search box in accordance with aspects of at least one embodiment of the present invention.

As illustrated in FIG. 15, according to another embodiment, if the user interface 1400 is already displaying a web browser, a press of the search button 908 will result in a search box 1502 being revealed. According to one embodiment, when the base station 106 is coupled to a television 104, the search box 1502 may be enlarged so that it is relatively easy for a user, operating the base station 106 from a distance, to see characters that have just been typed and so that it is relatively easy for a user to detect any typographical errors. The cursor 1503 of the user interface 1400 will focus on the search box 1502 (in preparation for input by the user via the keypad 902). If a previous search has been performed within the current web session, the previous query is retained within the search box and is automatically selected. Otherwise the search box is empty. In one embodiment, upon a user entering text 1506 into a search box 1502, the search box 1502 may provide selectable suggestions 1504 on what text the user is intending to search. A user may scroll through the suggestions using the touchpad 820 and select a suggestion by depressing the touchpad 820. According to one embodiment, a user may exit the URL 1402 or search box 1502 by pressing the URL 910 or search 908 button again, respectively (assuming no edits have been made to the box), pressing an escape key on the keypad 902, or using the touchpad 820 to select an area outside of the box.

According to another embodiment, if the user interface 1400 is already displaying a web browser, a URL box 1402 is already displayed and the URL of the current page has not been edited, a press of the URL button 910 will dismiss the URL box 1402 without taking action. If the user interface 1400 is already displaying a web browser, a URL box 1402 is already displayed and the URL box 1402 has been edited, a press of the URL button 910 will load the new URL and dismiss the URL box 1402. According to another embodiment, if the user interface 1400 is already displaying a web browser, a URL box 1402 is already displayed and the search button 908 is pressed, the currently displayed URL box 1402 will change to a search box 1502, any previously entered text or selections will be retained, and any applicable suggestions will be shown.

According to one embodiment, if the user interface 1400 is already displaying a web browser, a search box 1502 is already displayed and the search box 1502 has not been edited, a press of the search button 908 will dismiss the search box 1502 without taking action. If the user interface 1400 is already displaying a web browser, a search box 1502 is already displayed and the search box 1502 has been edited, a press of the search button 908 will perform the search and dismiss the search box 1502. According to another embodiment, if the user interface 1400 is already displaying a web browser, a search box 1502 is already displayed and the URL button 910 is pressed, the currently displayed search box 1502 will change to a URL box 1402, any previously entered text or selections will be retained, and any applicable suggestions will be shown.

According to one embodiment, if the user interface 1400 is already displaying a plurality of cards and the URL button 910 is pressed, a new web browser card will be opened, the user interface 1400 will zoom in on and focus in on a new URL box 1402 and the cursor 1403 of the user interface 1400 will focus on the new URL box 1402 (in preparation for input by the user via the keypad 902). According to another embodiment, if the user interface 1400 is already displaying a plurality of cards and the search button 908 is pressed, an empty card search box 1502 is opened and the cursor 1503 of the user interface 1400 will focus on the new card search box 1502 (in preparation for input by the user via the keypad 902).

According to one embodiment, if the user interface 1400 is already focused in on a single card and the URL button 910 is pressed, the user interface 1400 will zoom out to display the plurality of available cards, a new web browser card will be opened, the user interface 1400 will zoom in on and focus in on a new URL box 1402 and the cursor 1403 of the user interface 1400 will focus on the new URL box 1402 (in preparation for input by the user via the keypad 902). According to another embodiment, if the user interface 1400 is focused on a single card and the search button 908 is pressed, the user interface 1400 will zoom out and display the plurality of available cards, an empty card search box 1502 will be opened and the cursor 1503 of the user interface 1400 will focus on the new card search box 1502 (in preparation for input by the user via the keypad 902).

It is to be appreciated that by providing dedicated web buttons, the present invention provides a simple and efficient means of navigating web content displayed on a television 104. For example, by utilizing the dedicated web buttons, a user can avoid the tedious process of moving a cursor to a specific location to select an icon and can instead, just press a dedicated button.

According to another embodiment, the user interface 1400 also provides an auto search function. If neither a URL box 1402 or search box 1502 is currently displayed on the user interface 1400 and a user begins to enter text (e.g., through the keypad 708), a search box 1502 will automatically be opened, the cursor 1503 will focus on the search box 1502, and the text being entered by the user is input into the search box 1502. According to one embodiment, if the user interface recognizes the text entered by a user generally as Internet formatted (e.g., .com, urls, ftp, http, etc.), the user interface will perform an Internet URL search for the entered text. According to another embodiment, if a web browser is not opened and if the user interface does not recognize the text entered as Internet formatted, the user interface will search the user interface (e.g., applications, icons, cards, history, etc.) for the entered text. According to another embodiment, if a web browser is opened and if the user interface does not recognize the text entered as Internet formatted, the user interface will perform a web search for the entered text.

It also is to be appreciated that, according to one embodiment, the remote control 112 is easily configurable to switch seamlessly between the active and passive modes to provide easy and efficient operation of the base station 106 while coupled to a television. For example, a user may easily scroll through content utilizing the touchpad 820 in a passive mode and, as a result of not finding what she is looking for, slide open the remote control 112 into active mode to perform a search using the dedicated search button 908 and keypad 902.

Additionally, according to one embodiment, the base station 106 may also be able to inform a user when operation in a different mode may be preferred or even required. For example, while in passive mode, if a user selects information in the user interface requiring further interaction by the user (e.g., through the keypad 708), the user interface may display a message to the user indicating that the user must configure the remote control in active mode to proceed.

According to one embodiment, another mobile device (such as a mobile phone) may be configured to act as a proxy for the remote control. In one embodiment, the mobile device is configured to be operated substantially the same as the remote control 112. For example, the touch screen of a mobile phone may be operated as the touchpad 710 and the keypad of a mobile phone may be operated as the keypad 708. In addition, the accelerometer of the mobile phone may be utilized as the motion sensor 704 and the microphone may be utilized as the microphone 706. In one embodiment, the mobile phone communicates to the base station through Wi-Fi.

According to another embodiment, the base station 106 may also be configurable to operate as a dual mode base station 106. For instance, the base station 106 may be configured to provide different functionality based on the physical configuration of the base station 106. For example, in at least one embodiment, the base station 106 may be a computer system configurable to operate in a "laptop" mode (in which the base station 106 has a conventional laptop appearance utilizing conventional laptop controls such as a keyboard, touchpad etc) or an "easel" mode (in which the base station 106 and its display component (not shown) stand vertically forming an inverted "V."), as described in U.S. patent application Ser. No. 12/170,951 entitled "PORTABLE COMPUTER WITH MULTIPLE DISPLAY CONFIGURATIONS," filed on Jul. 10, 2008, which is herein incorporated by reference in its entirety.

According to at least one embodiment of the present invention, a remote control 112, as discussed above, may be configured to control the operational configuration of the base station 106. For example, in one embodiment, a remote control 112 may be configured to interact with and operate the user interface of a dual mode base station 106, as discussed above. However, instead of operating in an open or closed mode depending on the configuration of the remote control 112, the base station 106 may be configured to operate in a laptop or easel mode depending on the configuration of the remote control 112. For example, in one embodiment, when the dual mode base station 106 is coupled to a television 104 and the first portion 814 of the remote control 112 is slid into a first position (as illustrated in FIG. 8.), the base station 106 operates in easel mode and may be substantially controlled by operation of the touchpad 820. In another embodiment, when the dual mode base station 106 is coupled to a television 104 and the first portion 814 of the remote control 112 is slid into a second position (as illustrated in FIG. 9), the base station 106 operates in laptop mode and may be substantially controlled by operation of the touchpad 820 and keypad 902.

According to another embodiment, once connected to a television 104, a dual mode base station 106 may also be operated by controls on the base station 106 itself, absent input from the remote control 112. For example, when the dual mode base station 106 is coupled to a television 104 and is physically configured in laptop mode, the operation of the base station 106, and the interaction with the user interface of the base station 106, may be performed with the controls on the base station 106 (e.g., a touchpad, keyboard, etc.). When the dual mode base station 106 is coupled to a television 104 and is physically configured in easel mode, the operation of the base station 106, and the interaction with the user interface of the base station 106, may be performed through interaction with the base station's 106 display component (e.g., a touch screen or touchpad) (not shown).

According to at least one embodiment, a user may utilize both a remote control 112 and the controls on the base station 106 itself to operate a dual mode base station 106. In such an embodiment, the dual-mode base station 106 may respond to the last signals (in time) it receives successfully. For example, if a user physically flips the dual mode base station 106 into easel mode, the touchpad 820 of the remote control 112 may be used to interact with and control the dual mode base station 106 as if the first portion 814 of the remote control 112 was in a first position (as illustrated in FIG. 8), regardless of the actual configuration of the remote control 112. Similarly, if the dual mode base station 106 is in easel mode, and a user operating a remote control 112 slides the first portion 814 into a second position (as illustrated in FIG. 9), the touchpad 820 and keypad 902 of the remote control 112 may be used to interact with the dual mode base station 106 in laptop mode, regardless of the actual physical configuration of the dual mode base station 106.

In addition to improved control of the base station 106 via the remote control 112, the display signals sent by the base station 106 to the external display device 104 (e.g., television) may be configured, in a TV mode, to make interaction with the base station 106 more easy. For example, as discussed above, signals intended to be displayed on a conventional computer screen, may not transition well to being displayed on a television 104 (especially when the television 104 is intended to be viewed from a distance). As such, according to embodiments of the present invention, in TV mode, the signals sent by the base station 106 to the television 104 may be modified. It is to be appreciated that the base station 106 may operate in TV mode regardless of the configuration of remote control 112 or base station 106. For example, the base station 106 may operate in TV mode whether the remote control 112 is in an open or closed figuration or whether the base station 106 is in a laptop or easel mode configuration.

Many conventional televisions designed for displaying broadcast video content use a technique called "overscan" to crop the edges of the picture region, which historically contain artifacts not intended to be seen by the viewer. According to some examples, televisions may have an overscan region of up to 7.5% per side. While some televisions provide a way to turn overscan off when viewing content from a computer source, others do not. In order to reduce the need for the manual adjustment of television settings, to provide the best viewing experience possible and the maximize the use of the television screen while minimizing content lost beyond the edges of the television screen, the base station 106 may perform overscan correction.

According to one embodiment, once the base station 106 is connected to a television 104, the base station 106 enters TV mode. In TV mode, the base station 106 receives television identification information from the television 104. For example, according to one embodiment, if the television 104 is connected to the base station 106 via an HDMI connection, the base station 106 receives television identification information through Extended Display Identification Data (EDID). In one embodiment, EDID is a data structure which may include such information as the manufacturer's name, the television's serial number, the product type of the television, the timings supported by the television, display size of the television, pixel mapping data etc. Through the use of the EDID, the base station 106 determines if it has been connected to that specific television 104 before. If the base station 106 has not been connected to the specific television 104 before, the base station 106 initiates an overscan wizard and the user interface of the base station 104 displays the overscan wizard (on the television 104).

Figure 10:
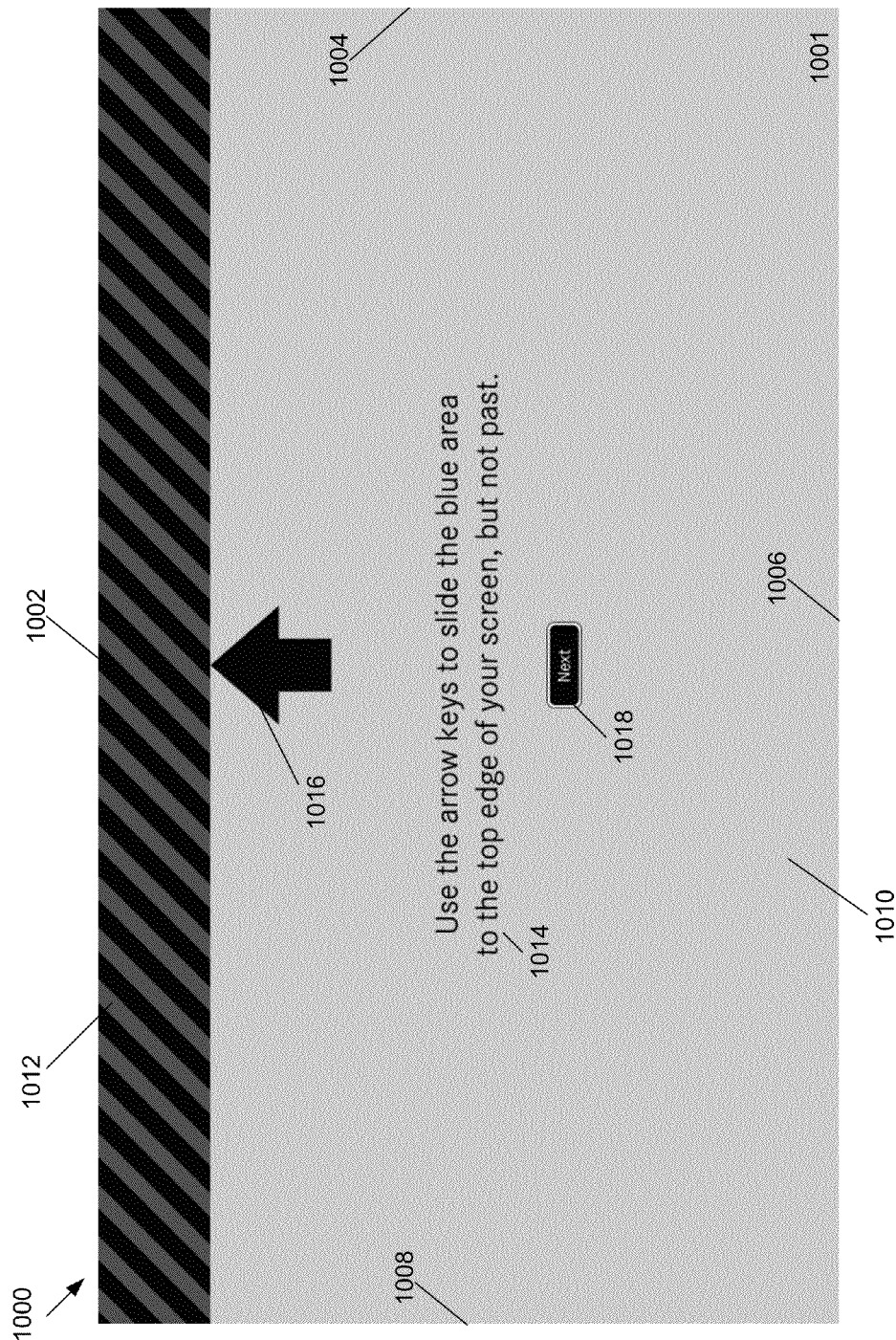
FIG. 10 is a screen shot of an overscan wizard in accordance with aspects of at least one embodiment of the present invention.

According to one embodiment, in TV mode, the base station 106 performs overscan correction through the use of the overscan wizard. FIG. 10 illustrates a screen shot 1000 of the overscan wizard interface 1001 displayed on the television 104 by the base station 106 upon activation of the overscan wizard. The overscan wizard interface 1001 includes a top edge 1002, a right edge 1004, a bottom edge 1006, and a left edge 1008. The overscan wizard interface 1001 also includes a first portion 1010 and a second portion 1012. According to one embodiment, the second portion 1012 is 15% of the entire interface 1001; however, it is to be appreciated that the second portion 1012 may begin as any portion of the interface 1001.

In one embodiment, the overscan wizard asks a user to identify the location of each edge of their television screen. According to one embodiment, the overscan correction wizard prompts the user to identify each edge 1002, 1004, 1006, 1008, one at a time, beginning with the top edge 1002 and moving clockwise; however, it is to be appreciated that the overscan correction wizard may start with any edge and may progress in any order.

According to one embodiment, the overscan wizard interface 1001 prompts the user (e.g., with text 1014, diagrams, sound etc.) to move the first portion 1010 of the interface 1001 to the appropriate edge of the screen as indicated by a large arrow 1016, thus eliminating the second portion 1012 of the interface 1001. According to one embodiment, the user may use the keypad 708 of the remote control 112 to move the first portion 1010. In another embodiment, the user may utilize the touchpad 710 to move the first portion 1010. In another embodiment, if the base station 106 is a dual mode base station as described above, a user may use the controls on the base station 106 itself (e.g., touch screen, touch pad, keyboard) to move the first portion 1010.

In one embodiment, with each additional control movement (e.g., finger swipe, button press, etc.) intended to move the first portion 1010 closer to one of the edges, 1002, 1004, 1006, 1008, the arrow 1016 flashes briefly and the first portion 1010 slides in the indicated direction, covering up more of the second portion 1012. In one embodiment, the first portion 1010 moves in intervals of 1.25% of the interface 1001 (or 9 pixels vertically or 16 pixels horizontally). According to another embodiment, a continuous control movement (e.g., a key held down or a double up/down movement) will cause the first portion 1010 to continuously slide near the edge. A user may then finesse the position of the first portion with discrete control movements as needed. Once a user has finished aligning the first portion 1010 with the desired edge, the user may advance the overscan wizard by pressing an enter key (e.g., on the keypad 708), depressing the touchpad 710, or using the touchpad 710 to control a cursor to select the "next" button 1018. In one embodiment, an option to return to a previous step (e.g., edge) may also be provided should the user advance by mistake.

As a user advances through the overscan wizard and configures the wizard for each edge 1002, 1004, 1006, 1008, the settings corresponding to each edge are stored (e.g., in local memory or in a network cloud) for later use (e.g., to move forward and backward through the overscan wizard so as not to repeat the process from the beginning). In one embodiment, each edge setting is stored in an account associated with the user. In another embodiment, the edge settings are also associated with a unique identifier for the television 104 on which the overscan wizard was performed. Storing the edge settings with an associated television identifier may allow the base station 106 to automatically recall the edge settings the next time the base station is connected to the same television 104. This way a user may not need to use the overscan wizard each time they connect to the same television 104. In addition to edge settings (through the overscan wizard), a user may also define other display settings such as contrast and brightness. The additional display settings may also be stored and associated with a specific television 104, to be recalled by the base station 106 when the base station 106 is reconnected to the specific television 104 and applied by display drivers and/or a rendering engine operated by the controller 204 of the base station 106.

Upon completion of the overscan wizard, according to one embodiment, the overscan edge settings are communicated to the display drivers and/or rendering engine of the base station 106. Utilizing the overscan settings, the display drivers and/or rendering engine may ensure that all information displayed by the base station 106 is maintained within the available screen area determined by the overscan wizard.

Figure 11:
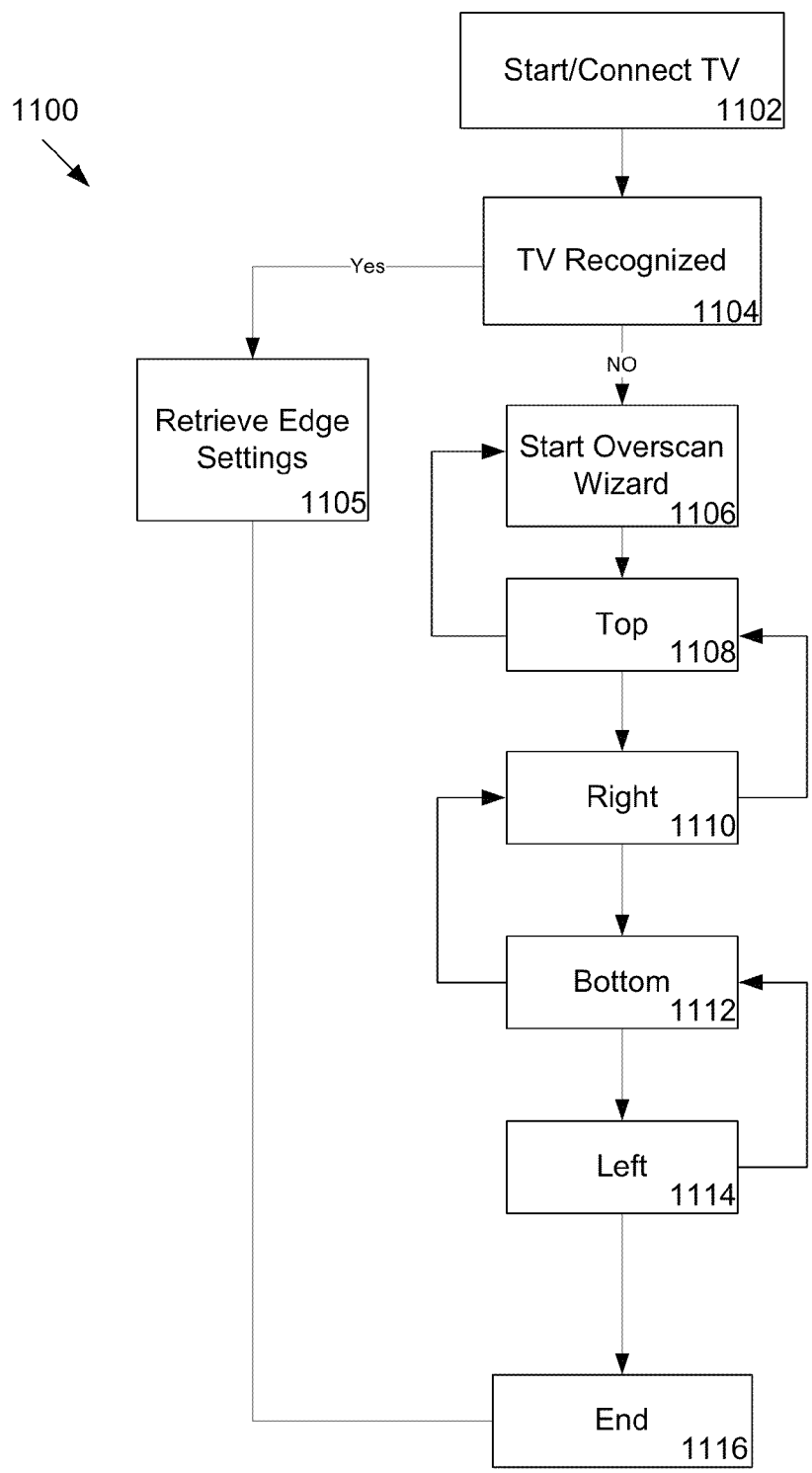
FIG. 11 is a flow diagram illustrating one example process of an overscan wizard in accordance with aspects of at least one embodiment of the present invention.

FIG. 11 illustrates a flow chart 1100 of the overscan wizard in TV mode according to one embodiment of the present invention. At block 1102, a base station 106 is connected to a television 104. As discussed above, according to one embodiment, the base station 106 and television 104 are connected via an HDMI connection. At block 1104, the base station 106 receives television identification information from the television 104 and compares the identification information to identification information of different televisions it has been connected to before. A determination is made whether the television 104 currently connected to the base station 106 has been connected to the base station 106 before.

In response to a determination that the television 104 currently connected to the base station 106 has been connected to the base station 106 before, at block 1105 the base station retrieves from memory (e.g., from local memory or from a network cloud) previously stored overscan setting information associated with the television 104 and the user, and adjusts the display configuration of the base station 106. At block 1116, the overscan wizard exits.

In response to a determination that the television 104 currently connected to the base station 106 has not been connected to the base station 106 before, at block 1106, the overscan wizard initiates. At block 1108, the user configures the overscan wizard to the top edge of the screen, as discussed above. From block 1108, the user may choose to store the top edge overscan setting and move on to block 1110 or he may choose to go back to the start of the overscan wizard, at block 1106.

Upon accepting the top edge overscan setting, at block 1110, the user configures the overscan wizard to the right edge of the screen, as discussed above. From block 1110, the user may choose to store the right edge overscan setting and move on to block 1112 or he may choose to go back to the top edge configuration screen, at block 1108.

Upon accepting the right edge overscan setting, at block 1112, the user configures the overscan wizard to the bottom edge of the screen, as discussed above. From block 1112, the user may choose to store the bottom edge overscan setting and move on to block 1114 or he may choose to go back to the right edge configuration screen, at block 1110.

Upon accepting the bottom edge overscan setting, at block 1112, the user configures the overscan wizard to the left edge of the screen, as discussed above. From block 1114, the user may choose to store the left edge overscan setting and move on to block 1116 or he may choose to go back to the bottom edge configuration screen, at block 1112. At block 1116, the overscan wizard exits. It is to be appreciated that blocks 1108 to 1114 may be configured in any order In addition to compensating for potential overscan issues, in TV mode the base station 106 may also adjust the overall layout of the base station's 106 user interface. According to one embodiment, each piece of information (e.g., cards, channels, applications, icons etc.), displayed by the base station 106, is configured with a flexible layout allowing it to be adjusted as needed to maximize the available screen area. For example, according to one embodiment, using the screen edge information retrieved by the overscan wizard and knowing that the display capabilities of the television 104 are oftentimes different than that of a conventional computer screen (e.g., many HD televisions have an HD standard aspect ratio of 16:9—either 1280×720 or 1920×1080), the display drivers and/or rendering engine of the base station 106 rearrange the information of the user interface (e.g., cards, icons, applications, channels etc.) displayed on the television 104 to ensure that pixel waste is limited and that no content or controls extend beyond the edges of the screen, interfering with the intended interaction.

In one embodiment, each piece of information displayed on the user interface of the base station 106 is defined with a pixel specification. According to one embodiment, each pixel specification includes a combination of springs and struts to indicate how a certain piece of information may be modified and/or scaled. For example, the springs and struts may define the relationship between the piece of information, other pieces of information and the user interface.

Based on the available information (e.g., overscan information, display settings of the television etc.) about the display capabilities of the television 104 and the pixel specifications of the information intended to be displayed on the television 104, in TV mode the display drivers and/or rendering engine modify and arrange the desired information so that the pieces of information are adequately displayed on the available display area of the television 104.

Figure 12:
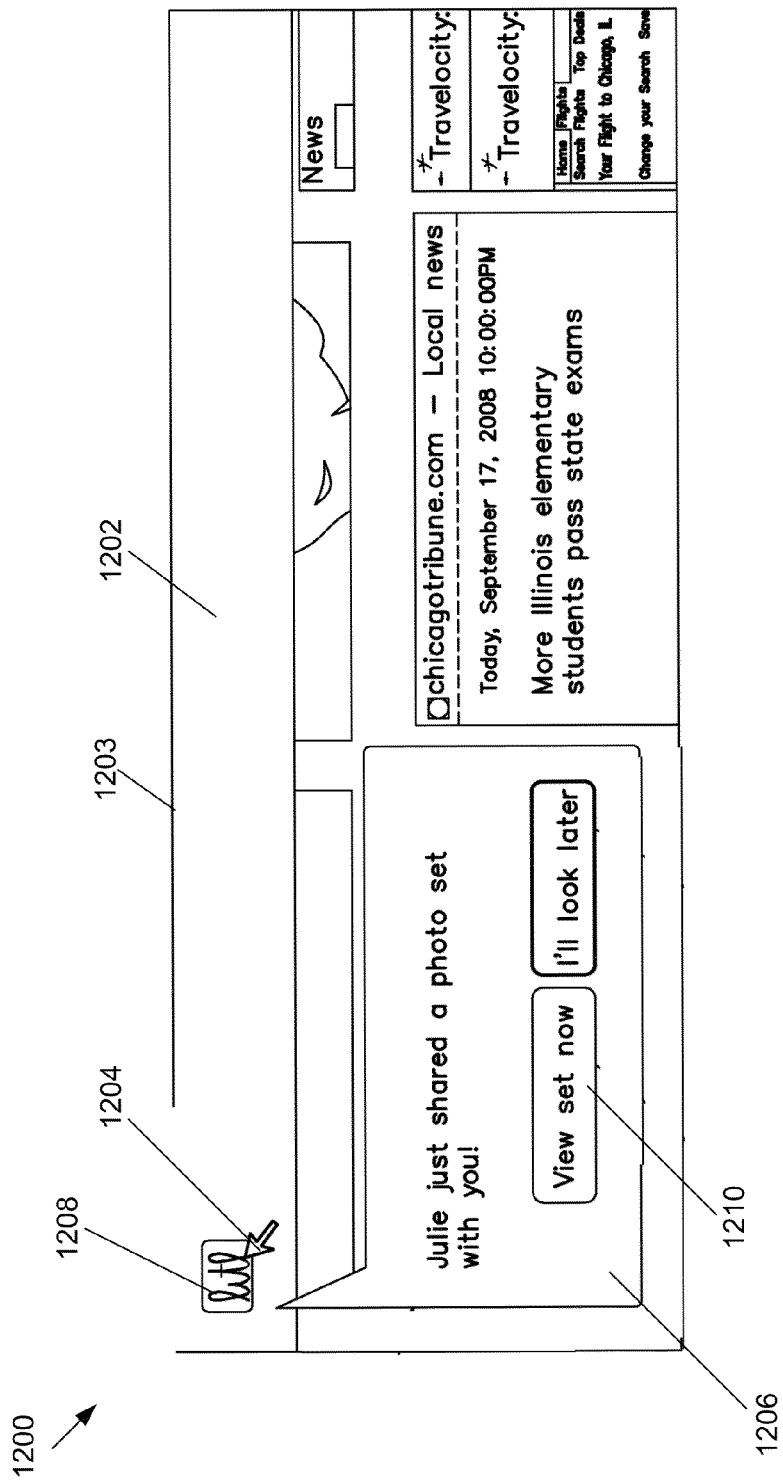
FIG. 12 is a diagram illustrating a user interface in accordance with aspects of at least one embodiment of the present invention.

In addition to arranging the user interface so as to provide all of the desired information on the television 104, in TV mode the display drivers and/or rendering engine of the base station 106 may also specifically manipulate components of the user interface. For example, according to one embodiment, when the base station 106 is coupled to the television 104, header portions of the user interface, are hidden, so that the user interface may take advantage of every available pixel on the television 104 for desired content. As illustrated in FIG. 12, a header portion 1202 is typically located at the top edge 1203 of the user interface 1200 and may include operational information related to the content displayed on the user interface (e.g., search tools (not shown), system messages 1206, navigation buttons 1208 etc.).

According to one embodiment, once the base station 106 is coupled to the television, the header portion 1202 is hidden until its use is required. For example, in one embodiment, when the header portion 1202 is hidden, a user who requires the use of the header portion 1202 may move the cursor 1204 to the top edge 1203 of the screen (e.g., at the topmost row of pixels). Once the cursor 1204 is at the top edge 1203 of the screen, a thin bar (not shown) appears across the topmost row of pixels, indicating the presence of a hidden header portion 1202. In one embodiment, if the user maintains the cursor 1204 at the top edge 1203 of the screen for a predetermined period of time, the header portion 1202 appears. In another embodiment, in addition to maintaining the cursor 1204 at the top of the screen, in order for the header portion 1202 to reappear, movement of the cursor 1204 must remain below a minimum threshold. According to one embodiment, movement of the cursor 1204 is calculated as a linear moving average of the last quarter of a second. In one embodiment, the minimum threshold speed is 80 pixels per second. However, it is to be appreciated that the movement of the cursor 1204 may be calculated in any way and the minimum threshold may be defined as any amount of time. In addition, according to another embodiment, a user may activate the header portion 1202 by clicking on the thin bar at the top of the screen (e.g., with the touchpad 710).

According to one embodiment, the header portion 1202 slides into the user interface 1200, pushing the rest of the displayed information downward and causing the information at the bottom of the user interface 1200 to move off of the screen. In another embodiment, the header portion 1202 slides over the displayed information at the top edge 1203 and does not displace any of the other information. According to one embodiment, once the header portion 1202 is activated, it remains visible while it is being used. For example, the header portion 1202 remains visible when a text field (e.g., of a search or URL box) is active, when a drop down menu within the header portion 1202 is currently open, or when a system message 1206, requiring action by the user, is displayed.

According to one embodiment, once the cursor 1204 is no longer located within the header portion 1202 and the header portion has been inactive for a pre-determined period of time, the header portion 1202 slides off screen As discussed above, when in certain modes of operation (e.g., passive mode), the base station 106 may hide the cursor 1204 as the user operates the user interface of the base station mainly through use of the touchpad 710 (e.g., by automatic scrolling). However, in some embodiments, while operating the base station 106, a user may still have a need for the use of the cursor 1204 (e.g., when making a selection in active or laptop mode). For example, in certain configurations as described above, a user may operate a touchpad (e.g., of the remote control 112 or the base station 106 itself) to manipulate a cursor 1204 in order to interface with the user interface of the base station 106. However, when connected to the television 104 and operated from a distance, the use of a cursor may become more difficult. Therefore, according to one embodiment, in addition to overscan protection and flexible layouts, in TV mode the base station 106 may also be configured to modify a cursor 1204 when the base station 106 is coupled to the television 104 and is configured in active or laptop mode.

According to some embodiments of the present invention and as illustrated in FIG. 12, a cursor 1204 operated by a user to interface with a base station 106 may be modified to be more easily operated by a user operating the base station 106 from a distance (via a television 104). In one embodiment, in addition to configuring the user interface of the base station 106 to be confined to the available display output of the television 104, as discussed above, the display drivers and/or rendering engine of the base station 106 may also constrain a cursor 1204 to the same available display output. In this way, the cursor may be prevented from becoming lost beyond the edge of the television screen and information near the television screen edges (e.g., header buttons and scrollbars) may be more easily used.

In conventional computer systems, cursors are traditionally small. However, while this may be adequate when a user is operating the computer system from a short distance directly in front of a computer screen, the small cursor may be difficult to follow when a user is operating the computer system from a distance (e.g., from the other side of a room). Therefore, according to at least one embodiment of the present invention, once the base station 106 is coupled to a television 104, the display drivers and/or rendering engine of the base station 106 may increase the size of cursor 1204. For example, in one embodiment, the cursor 1204 is increased by 50%; however, it is to be appreciated that the cursor 1204 may be increased by any amount.

In order to prevent the increased size cursor 1204 from interfering with the display content of the base station 106 (e.g., while a user is attempting to view online video content on the television 104), according to one embodiment the display drivers and/or rendering engine of the base station 106 hide the cursor 1204 after a period of inactivity. For example, in one embodiment, the cursor 1204 is hidden after a 10 second period of inactivity; however, it is to be appreciated that the period of inactivity may be defined as any amount of time.

Because of the relatively limited use of the cursor 1204 and the potential hiding of the cursor 1204 after a period of inactivity, a user may lose track of the cursor 1204 (e.g., especially when operated from a distance). According to one embodiment, in order to prevent a user from losing track of the cursor 1204, the display drivers and/or rendering engine of the base station 106 may highlight the cursor 1204 briefly upon the cursor 1204 being initially moved. For example, according to one embodiment, when the cursor 1204 is first moved, an animated wave-like effect, emanating from the cursor 1204, may be displayed, indicating to the user the position of the cursor 1204. It is to be appreciated that any highlighting effect may be used to signal the position of the cursor 1204.

When a user is operating the base station 106 in TV mode via the user interface displayed on the television 104, certain messages 1206 from the base station 106 may be displayed on the television 104. In some embodiments, these messages 1206 may require action by the user. For example, while operating the base station 106, a message 1206 (e.g., via a dialogue bubble) may appear on the screen informing the user that the remote control 112 firmware requires updating, that another user is requesting a video chat, or even that the battery power of the remote control 112 is running low. When a user is viewing the content from the base station 106 on the television 104 and is not actually interacting with the base station 106, it may be a difficult and time consuming process for the user to stop what they are doing and deal with the message 1206.

For instance, if a user is mainly viewing content on the television (e.g., online video content) without actually interacting with the base station 106, the cursor 1204 may be hidden (as discussed above). If a message 1206 then appears on the screen, requiring a response from the user, not only will the video content be interrupted, but the user will have to determine the location of the cursor 1204 and operate the cursor 1204 to deal with the message 1206. Therefore, according to at least one embodiment of the present invention, a hidden cursor 1204 is configured to automatically jump (warp) to the location of any messages 1206 from the base station 106 displayed on the television 104. In addition, in at least one embodiment, not only will the hidden cursor 1204 jump to the location of the message 1206, but the cursor 1204 will be located in such a position that a single operation by the user will dismiss the message 1206.

For example, as illustrated in FIG. 12 and according to one embodiment of the present invention, content being viewed by the user is interrupted by a message 1206 from the base station 106 informing the user that a friend has shared their photo set and inquiring whether the user wishes to view the set now or look at it later. In response the hidden cursor 1204 automatically positions itself at the location of the message 1206, the cursor 1204 is highlighted (as discussed above), and the cursor 1204 is automatically positioned over a button 1210, which when pressed, indicates to the base station 106 that the user wishes to view the photo set. In this way, by making a simple operation (e.g., pressing on the touchpad 710 or pressing an "Enter" key on the keypad 708), the user can respond affirmatively to the message and quickly dismiss the message 1206. In another embodiment, once the cursor jumps to the message from the base station and is highlighted, a user may press a different key (e.g., an "Escape" key on the keypad 708) to respond negatively to the message and also quickly dismiss the message 1206.

It is to be appreciated that according to one embodiment, only hidden cursors 1204 will automatically jump to messages 1206 from the base station 106, so as not to interfere with a non-hidden cursor 1204 currently being used by the user. However, in other embodiments, all cursors 1204 may be configured to automatically jump to the location of a system message 1206.

Figure 13:
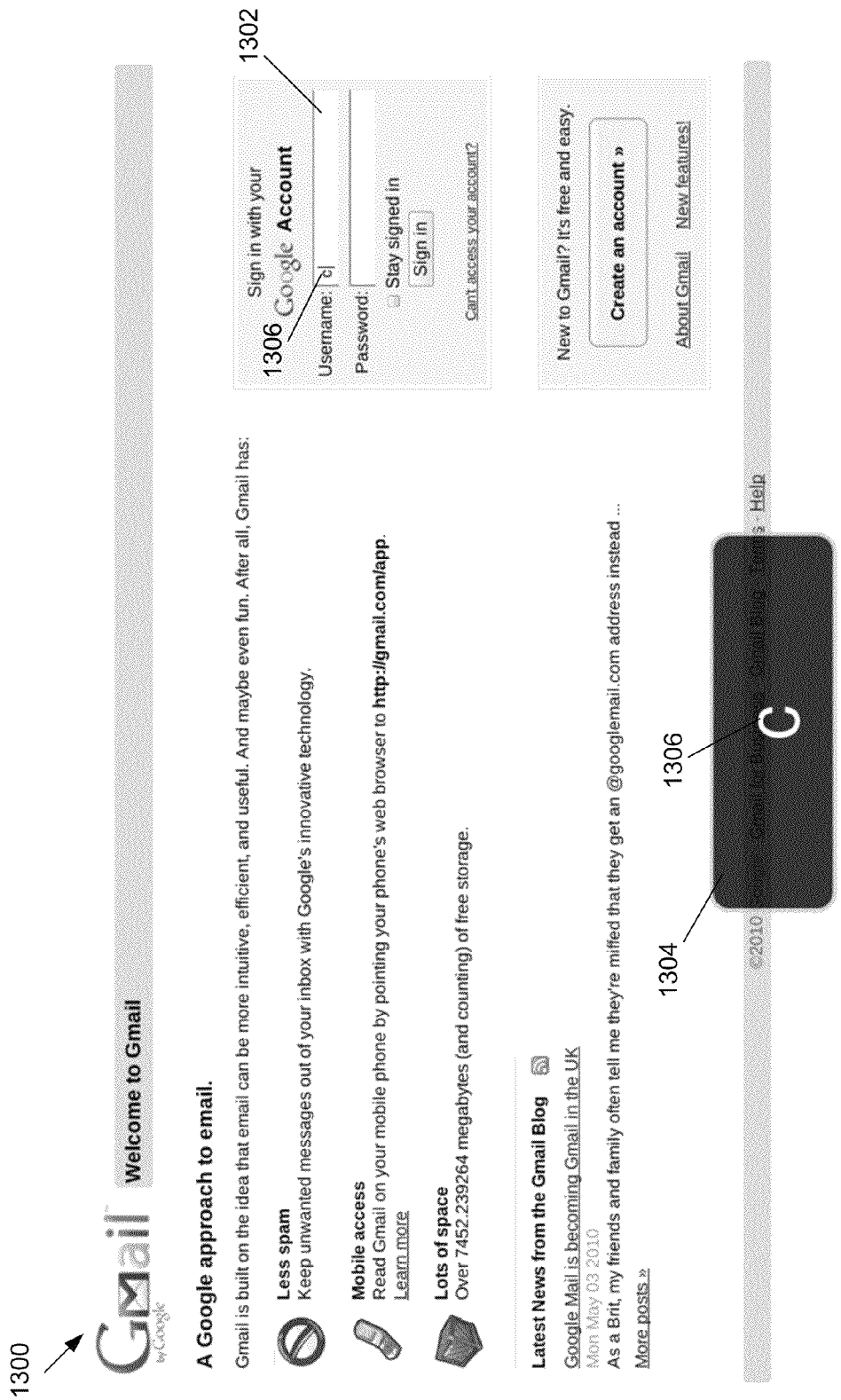
FIG. 13 is a diagram illustrating a user interface illustrating a text overlay in accordance with aspects of at least one embodiment of the present invention.

Inputting text to the base station 106 from a distance (via the remote control 112) can be difficult without adequate feedback. For example, when using a remote control 112, instead of a conventional standard size keyboard, to enter text into the user interface from a distance, a user may need to continuously change their gaze by looking up at the screen and then down at the remote control 112 while typing, in order to ensure the accurate input of the text. This may be a time intensive, inefficient and even frustrating process Therefore, according to at least one embodiment of the present invention, in TV mode the display drivers and/or rendering engine of the base station 106 are configured to display large and immediate feedback for as much text input as possible, thereby making it relatively easy to see the characters that have just been typed and making it possible to more easily confirm typographical errors. For example, as illustrated in FIG. 13 and according to at least one embodiment, when a text field 1302 in the user interface 1300 is selected by a user and the user begins to enter text, an overlay 1304, containing recently typed characters 1306 appears. The overlay 1304 is transient, appearing immediately when a character is typed, and disappearing again after a predetermined period of time without any additional input or upon movement of the cursor (not shown). According to one embodiment, the overlay 1304 disappears after two seconds without any additional input; however, it is to be appreciated that the overly 1304 may be configured to disappear after any amount of time without additional input.

According to one embodiment, even when the overlay 1304 disappears (e.g., because of inactivity), the text previously entered into the overlay 1304 will not clear and will continue to be displayed when the overlay 1304 is again displayed. In one embodiment, the overlay 1304 will only clear when whitespace is entered by the user, or when any other form of input alters the position of the cursor. As a result, until a space or other input clears the overlay 1304, a "backspace" key of the keypad 708 may be used to make corrections as needed.

According to one embodiment, the overlay 1304 appears in the lower middle area of the user interface 1300, where it is least likely to obscure the selected text field 1302 and where it is relatively easy to view by a user glancing up from the remote control 112. As a user enters text, the overlay 1304 grows as necessary. In one embodiment, the overlay 1304 will display an ellipsis at the beginning should the input exceed the width of the screen. According to one embodiment, any characters entered into the overlay 1304 are mirrored within the text field 1302. In one embodiment, the characters entered into the overlay 1304 are mirrored instantly into within the text field 1302. It is to be appreciated that, according to one embodiment, the overlay 1304 may be utilized in TV mode whenever a user wishes to enter text into a text field 1302.

As discussed above; cursors, text, search and URL boxes may all be enlarged by the display drivers and/or rendering engine of the base station 106 to improve their ease of use while the base station 106 is being operated from a distance. In addition, according to one embodiment, while in TV mode, the display drivers and/or rendering engine of the base station 106 may also zoom into the entire layout of a desired page. For example, in order to take advantage of all the available pixels available on a television 104, the display drivers and/or rendering engine of the base station 106 zooms pages, using full page zoom, to fit the width of the screen.

According to one embodiment, pages are zoomed as much as possible without requiring horizontal page scrolling, up to a maximum of 150% of their native size. However, it is to be appreciated that the display drivers and/or rendering engine may be configured to zoom into the pages at any level. In one embodiment, zooming into the page increases the size of the text on the page, so that it is readable at a distance. In addition, according to one embodiment, zooming into the page also increases the relative size of any links on the page, making the links easier to read and easier to navigate when using the touchpad 710 of the remote control 112. According to another embodiment, the user may still be able to manually control the level of zoom displayed in the user interface (e.g., via shortcut keys on the keypad 708 or actual controls displays in the user interface).

As discussed previously, through an HDMI connection and the EDID data structure, the base station 106 may receive information about the television 104. In addition to using the information to identify televisions connected previously to the base station 106 (as discussed above), according to one embodiment of the present invention, the information sent from the television may also be used to adjust settings in the base station 105.

For example, according to one embodiment, when the base station 106 is connected to the television 104 (via an HDMI connection), the base station 106 enters TV mode. The base station may receive display capabilities from the television (e.g., overscan area, pixel settings, refresh rate, brightness and contrast settings etc.) and configure the video output display signals sent from the base station 106 to the television 104 based on the display capabilities. For example, in one embodiment, if the television 104 sends overscan information to the base station 106, the base station 106 can configure the layout of the user interface without running the overscan wizard. In another embodiment, if the television 104 sends resolution and pixel information to the base station 106, the base station 106 can configure the layout of the user interface to best utilize all of the available pixels. It is to be appreciated that the base station 106 may receive any type of display information from the television 104 and may adjust its display settings to provide the best display possible on the television 104.

According to one embodiment, in addition to display capabilities of the television, in TV mode the base station 106 may also receive content type display information over the network 110 associated with the type of content that is currently being displayed on the television 104. For example, in one embodiment, the content type display information received by the base station 106 may indicated what the user is currently viewing. In response to the content type display information, the display drivers and/or rendering engine of the base station may adjust the display settings of the base station 106 accordingly. For example, if the content type display information indicates to the base station 106 that the user is watching online video content, the display drivers and/or rendering engine of the base station 106 may adjust the brightness and contrast settings of the base station 106 along with the layout of the user interface to provide the most efficient and best quality video signals possible to the television 104. It is to be appreciated that the user interface of the base station 106 may be configured in any way in response to any type of content type display information.

According to another embodiment, in TV mode the base station 106 may also receive content subject matter display information over the network 110 associated with the subject matter of the content that is currently being displayed on the television 194. In one embodiment, in response to the subject matter display information, the display drivers, rendering engine and controller 204 of the base station present related material to the user. For example, in on embodiment, the base station 106 may receive information over the network 110 that the user is currently viewing sports related material in the web browser. In response to such signals, the base station 106 may display additional sports related content or sports related advertising that the user may be interested in. In another example, according to one embodiment, the base station 106 may receive information that the user is currently viewing a certain television program (e.g., either through online video or other broadcast means such as cable or satellite television).

In response, the base station 106 may display additional content or advertisements related to the television program.

According to one embodiment, while in TV mode, the base station 106 may provide audio feedback for certain actions taken by the user and/or the base station 106. This helps the user to better appreciate their interaction with the base station. For example, in one embodiment, the base station 106 plays a sound when a new system message 1206 is displayed, when the cursor 1204 is highlighted, or when a new text box is opened. However, it is to be appreciated that the base station 106 may be configured to play any defined sound for any action. Through the sounds, the user may quickly be able to determine what action the base station 106 has just taken and/or what actions the user must perform.

As described above, the present invention provides a computer system capable of being coupled to an external display device that provides efficient use of the computer system through a remote control and reduces the problems with external display device/computer system compatibility through display signal modification.

What is claimed is:

1. A computer system comprising:
   a base station having a communication interface adapted to communicate with an external network;
   an external display device coupled to the base station and configured to receive output display signals from the base station;
   a user interface displayed on the external display device and generated in response to the output display signals, wherein the user interface is selectively configurable into at least one of a streamlined mode of content and a full mode of content; and
   a remote control configured to communicate with the base station and to permit a user to interact with the user interface displayed by the external display device,
   wherein the remote control is physically manipulable into at least two input mode configurations including a first physical configuration corresponding to the streamlined mode of content of the user interface and a second physical configuration corresponding to the full mode of content of the user interface,
   wherein the remote control is further configured to transmit a signal to the base station, the signal indicating whether the remote control is in the first physical configuration or the second physical configuration, and
   wherein the user interface is configured in one of the streamlined mode of content and the full mode of content responsive to the signal from the remote control indicating whether the remote control is in the first physical configuration or the second physical configuration.

2. The computer system of claim 1, wherein the remote control is configured to communicate wirelessly with the base station.

3. The computer system of claim 2, wherein the remote control includes a Radio Frequency (RF) transmitter configured to communicate with the base station.

4. The computer system of claim 1, wherein the remote control comprises:
   a first portion; and
   a second portion slideably coupled to the first portion,
   wherein the first portion is configured to be manipulated into a first position, relative to the second portion, in the first input mode configuration of the remote control, and wherein the first portion is configured to be manipulated into a second position, relative to the second portion, in the second input mode configuration of the remote control.

5. The computer system of claim 4, wherein the user interface is configured to display the streamlined mode of content in response to the first portion being manipulated into the first position, and wherein the user interface is configured to display the full mode of content in response to the first portion being manipulated into the second position.

6. The computer system of claim 1, wherein the external display device is a television.

7. The computer system of claim 6, wherein the base station is connected to the television via a High Definition Multimedia Interface (HDMI) connection.

8. The computer system of claim 7, wherein the base station is configured to receive television identification information from the television via the HDMI connection.

9. The computer system of claim 7, wherein the base station is configured to receive display capability information from the television via the HDMI connection.

10. A non-transitory computer-readable medium comprising computer-executable instructions that, when executed on a processor, perform a method for controlling a computer system, the computer system comprising a base station coupled to an external network and an external display device coupled to the base station, the method comprising acts of:
communicating with the external network via the base station;
transmitting output display signals from the base station to the external display device in response to the act of communicating;
generating a user interface on the external display device in response to the output display signals, wherein the user interface is selectively configurable into at least one of a streamlined mode of content and a full mode of content;
interacting with the user interface through a remote control;
physically manipulating the remote control into one of at least two input mode configurations including a first physical configuration corresponding to the streamlined mode of content of the user interface and a second physical configuration corresponding to the full mode of content of the user interface;
configuring the user interface to display the streamlined mode of content in response to the act of manipulating the remote control into the first physical configuration; and
configuring the user interface to display the full mode of content in response to the act of manipulating the remote control into the second physical configuration.

11. A method of controlling a computer system, the computer system comprising a base station coupled to an external network and an external display device coupled to the base station, wherein the method comprises acts of:
communicating with the external network via the base station;
transmitting output display signals from the base station to the external display device in response to the act of communicating;
generating a user interface on the external display device in response to the output display signals, wherein the user interface is selectively configurable into at least one of a streamlined mode of content and a full mode of content;
interacting with the user interface through a remote control;
physically manipulating the remote control into one of at least two input mode configurations including a first physical configuration corresponding to the streamlined mode of content of the user interface and a second physical configuration corresponding to the full mode of content of the user interface; and
configuring the user interface to display the streamlined mode of content in response to the act of manipulating the remote control into the first physical configuration.

12. The method of claim 11, further comprising an act of configuring the user interface to display the full mode of content in response to the act of manipulating the remote control into the second physical configuration.

13. The method of claim 12, wherein the act of manipulating the remote control into the first physical configuration includes sliding a portion of the remote control into a first position and wherein the act of manipulating the remote control into the second physical configuration includes sliding the portion of the remote control into a second position.

14. The method of claim 11, further comprising:
connecting the base station to the external display device;
receiving, from the external display device, display capability information; and
configuring the user interface in response to the act of receiving.

15. A computer system comprising:
a base station configured to be coupled to an external network and to send and receive signals from the external network;
an external display device coupled to the base station and configured to receive output display signals from the base station;
a user interface displayed on the external display device and generated in response to the output display signals, wherein the user interface is selectively configurable into at least one of a streamlined mode of content and a full mode of content; and
a means for remotely communicating with and controlling the base station, wherein the means permits a user to select for display on the external display device one of the streamlined mode of content and the full mode of content of the user interface.

16. The computer system of claim 15, wherein the means for remotely communicating with and controlling the base station includes a means for communicating wirelessly with the base station.

17. The computer system of claim 15, further comprising a means for receiving display capability information from the external display device.

18. A computer system comprising:
a base station having a first communication interface adapted to communicate with an external network and a second communication interface adapted to be coupled to an external display device, wherein the second communication interface is further adapted to transmit output display signals to the external display device, wherein the output display signals are configured to generate a user interface for display on the external display device, and wherein the user interface is selectively configurable into at least one of a streamlined mode of content and a full mode of content; and
a remote control configured to communicate with the base station and to permit a user to interact with the user interface displayed by the external display device, wherein the remote control is physically manipulable into at least two input mode configurations including a first physical configuration corresponding to the streamlined mode of content of the user interface and a second physical configuration corresponding to the full mode of content of the user interface, and wherein the remote control is further configured to transmit a signal to the base station, the signal indicating whether the remote control is in the first physical configuration or the second physical configuration, and wherein the user interface is configured in one of the streamlined mode of content and the full mode of content responsive to the signal from the remote control indicating whether the remote control is in the first physical configuration or the second physical configuration.

\* \* \* \* \*